(12) United States Patent
Smith et al.

(10) Patent No.: US 7,213,064 B2
(45) Date of Patent: May 1, 2007

(54) METHODS AND SYSTEMS FOR JOB-BASED ACCOUNTING

(75) Inventors: Steven B. Smith, Holladay, UT (US); Nicholas A. Thomas, Orem, UT (US); Warren M. Rosner, South Jordan, UT (US)

(73) Assignee: In2M Corporation, Draper, UT (US)

( * ) Notice: Subject to any disclaimer, the term of this patent is extended or adjusted under 35 U.S.C. 154(b) by 613 days.

(21) Appl. No.: 09/829,364

(22) Filed: Apr. 9, 2001

(65) Prior Publication Data

US 2002/0147668 A1 Oct. 10, 2002

Related U.S. Application Data

(60) Provisional application No. 60/226,187, filed on Aug. 18, 2000.

(51) Int. Cl.
*G06F 15/173* (2006.01)

(52) U.S. Cl. .............. 709/223; 709/229; 709/232; 705/30

(58) Field of Classification Search ........... 705/30; 709/223, 226, 229, 232; 718/102, 105
See application file for complete search history.

(56) References Cited

U.S. PATENT DOCUMENTS

| | | | | |
|---|---|---|---|---|
| 4,567,359 | A * | 1/1986 | Lockwood .................. | 235/381 |
| 4,642,767 | A | 2/1987 | Lerner ........................ | 364/406 |
| 5,117,356 | A | 5/1992 | Marks ........................ | 364/406 |
| 5,745,706 | A * | 4/1998 | Wolfberg et al. ............ | 705/35 |
| 5,799,286 | A | 8/1998 | Morgan et al. .............. | 705/30 |
| 5,815,829 | A | 9/1998 | Zargar ........................ | 705/30 |
| 5,867,494 | A * | 2/1999 | Krishnaswamy et al. ... | 370/352 |
| 5,875,435 | A | 2/1999 | Brown ........................ | 705/30 |
| 5,878,337 | A * | 3/1999 | Joao et al. .................. | 455/406 |
| 5,884,283 | A | 3/1999 | Manos ........................ | 705/30 |
| 5,910,987 | A * | 6/1999 | Ginter et al. ................ | 705/52 |
| 5,937,395 | A | 8/1999 | Iwamura ..................... | 705/30 |
| 5,949,876 | A * | 9/1999 | Ginter et al. ................ | 705/80 |
| 5,958,071 | A * | 9/1999 | Iida et al. ................... | 714/17 |
| 6,014,640 | A | 1/2000 | Bent .......................... | 705/30 |
| 6,032,131 | A | 2/2000 | Vogel ......................... | 705/30 |

(Continued)

OTHER PUBLICATIONS

Nineteen (19) pages from "www.virtualpayroll.com" website, 1997.*

(Continued)

*Primary Examiner*—Andrew Joseph Rudy
(74) *Attorney, Agent, or Firm*—Kirton & McConkie; Michael F. Krieger

(57) ABSTRACT

The present invention relates to an automated, mobile method for remotely managing the resources of a job-based business through real-time allocation of the resources among a set of user-defined virtual spending accounts. The method enables the user to establish two layers of virtual accounts. One layer comprises job accounts that represent individual jobs or projects. The other layer comprises allocation accounts that represent categories of transactions such as "materials," "labor," "facilities," and "insurance." The user uses these virtual accounts in conjunction with actual accounts to track the user's transactions in real time. The user may also use the present invention to create and remotely transmit purchase orders and invoices, keep a record of employees, enter employee time sheets, process payroll, and allocate and reconcile incoming and outgoing transactions between the various virtual accounts.

27 Claims, 21 Drawing Sheets

U.S. PATENT DOCUMENTS

| | | | |
|---|---|---|---|
| 6,038,547 A | 3/2000 | Casto | 705/30 |
| 6,041,312 A | 3/2000 | Bickerton et al. | 705/30 |
| 6,047,267 A | 4/2000 | Owens et al. | 705/34 |
| 6,047,270 A * | 4/2000 | Joao et al. | 705/44 |
| 6,049,785 A * | 4/2000 | Gifford | 705/39 |
| 6,058,375 A | 5/2000 | Park | 705/30 |
| 6,085,173 A | 7/2000 | Suh | 705/30 |
| 6,092,055 A | 7/2000 | Owens et al. | 705/34 |
| 6,108,641 A | 8/2000 | Kenna et al. | 705/35 |
| 6,144,848 A * | 11/2000 | Walsh et al. | 455/419 |
| 6,144,946 A | 11/2000 | Iwamura | 705/30 |
| 6,163,272 A * | 12/2000 | Goode et al. | 725/30 |
| 6,205,437 B1 * | 3/2001 | Gifford | 705/75 |
| 6,347,306 B1 * | 2/2002 | Swart | 705/32 |
| 6,473,609 B1 * | 10/2002 | Schwartz et al. | 455/406 |
| 6,625,447 B1 * | 9/2003 | Rossmann | 455/426.1 |
| 6,742,022 B1 * | 5/2004 | King et al. | 709/219 |
| 6,764,013 B2 * | 7/2004 | Ben-Aissa | 235/472.01 |
| 6,829,765 B1 * | 12/2004 | Chan et al. | 718/100 |
| 6,889,243 B1 * | 5/2005 | Hondou et al. | 718/100 |
| 6,978,232 B1 * | 12/2005 | Tobler | 703/21 |
| 2001/0037316 A1 * | 11/2001 | Shiloh | 705/74 |
| 2002/0016778 A1 * | 2/2002 | Konno et al. | 705/80 |
| 2002/0022966 A1 * | 2/2002 | Horgan | 705/1 |
| 2002/0069122 A1 * | 6/2002 | Yun et al. | 705/26 |
| 2002/0109680 A1 * | 8/2002 | Orbanes et al. | 345/418 |

OTHER PUBLICATIONS

Goldman, J. "NetLedger: The Yahoo! of Accounting?", 2001, Retrieved from the Internet: <URL:http://www.aspisland.com/focus/NetLEdger.asp> Retrieved on Sep. 26, 2001, 9 pages, see entire document.

* cited by examiner

METHODS AND SYSTEMS FOR JOB-BASED ACCOUNTING

RELATED APPLICATION

This application claims priority to both U.S. Provisional Application Ser. No. 60/226,187, filed 18 Aug. 2000, entitled, Methods and Systems for Job Based Accounting to Steven B. Smith et al. and claims priority to U.S. Provisional Application No. 60/198,961 filed Apr. 21, 2000, entitled Method and System for Managing Spending Through Account Allocation to Steven B. Smith et al., hereby incorporated by reference.

BACKGROUND OF THE INVENTION

1. Field of the Invention

The present invention relates generally to computer-based resource management systems, and, more particularly, to the job-based management of a business' financial resources through the allocation of resources to various user-defined accounts in an automated environment.

2. Background

Often individuals or businesses need and desire to achieve some measure of control over their financial affairs. Several software accounting programs have been developed to aid a business in managing its financial resources. Some of these programs include a budgeting system that allows a business to see where its money is invested or spent. Some of these programs further provide the user with the ability to perform several types of financial transactions on-line, including the ability to pay bills and to receive updated information with respect to cleared transactions from financial institutions such as banks and credit card companies.

One major problem with these existing accounting programs is the inability to provide up-to-date financial information needed to a business owner who is constantly on the go. For example, this problem represents a long-felt but unsolved need that is particularly taxing to sole proprietors who run a construction business. Often such a sole proprietor will be out in the field all day long engaging in various financial transactions, only to return home with a handful of bills and receipts representing transactions to either manually enter into a software program on a personal computer or to give to an accountant or CPA at the end of each month, quarter, or even year. Not only does this manual, after-the-fact, transaction entry take a great deal of time; without real-time access to account information, the business owner cannot make informed spending decisions while out in the field away from his or her personal computer. In other words, although existing accounting programs allow a user to establish a budget, these programs are inadequate because a user who is out in the field cannot make informed spending decisions without real-time access to his or her account information.

Besides not being able to provide real-time information, existing accounting programs also do not provide simple and intuitive budgeting systems that ensure that each spending decision is made in accordance with an established budget. For example, existing accounting programs typically allow the user to see how funds have been allocated between different financial accounts by providing a representation or statement indicating how funds were allocated during a period of time such as a week, month, quarter, or year. That is, these accounting programs compare budgeted amounts with actual spending only after the spending has occurred. Moreover, when a business' transactions involve several different financial projects (e.g., in businesses such as job shops that contract out individual jobs or projects and/or regularly make job bids or estimates), this after-the-fact budget reporting proves complicated and useless for the typical small business owner who must quickly summarize such reported information in his or her head when making on-the-spot spending decisions.

SUMMARY AND OBJECTS OF THE INVENTION

Some embodiments of the present invention provide a job-based method and system for managing business resources through allocation of the resources among a set of user defined virtual spending accounts. The method, inter alia, enables the user to establish two layers of virtual accounts, virtual job accounts and virtual allocation accounts, that interact with the user's actual accounts. In a preferred embodiment, the job accounts represent various jobs or projects and are each designated by an envelope icon and a job number; the allocation accounts are designated by an envelope icon representing allocations or categories of transactions such as, e.g., materials, labor, permits, paint subcontractors, facilities, or insurance. After establishing the virtual accounts, the user establishes a limit representing a spending limit for each envelope or virtual spending account. Thereafter, the user's transactions with other businesses or entities are reflected in the virtual spending accounts as well as in the user's actual accounts.

For example, some embodiments of the present invention can be used by a small business owner to make a job quote or bid that, upon approval/receipt of a contract, becomes saved as a job account with a corresponding envelope and job number. The business owner may set various spending limits for each job account as well as for various allocation categories (e.g., for "materials" and "labor," as mentioned above). Thereafter, the business owner may enter and keep track of transactions and compare actual spending with the budgeted limits set for each particular job account as well as the limits set for each allocation account within a particular job account. A preferred embodiment of the present invention also allows the user to create purchase orders and invoices, keep a record of employees, enter employee time sheets, process payroll, and allocate and reconcile incoming and outgoing transactions between the various accounts. Preferably, the user performs all these functions using a mobile computing unit, such as a personal digital assistant (PDA), laptop, or cell phone, that can remotely access account information.

Each time the user makes a spending transaction with respect to a particular job or project, the user may choose one or more appropriate job and/or allocation accounts from which to debit. Likewise, each time the user conducts an income-receiving transaction, the user may choose to which job and/or allocation account to allocate the amount. In other words, the user "spends" from and "deposits" to the virtual job and allocation accounts as though they were traditional bank accounts. In some embodiments, the user can also set certain transactions to debit or credit various accounts "automatically" at regular intervals of time or upon the happening of a certain event such as an on-line account reconciliation. In the preferred embodiments, the user may view a visual representation of the amount currently present in each virtual account juxtaposed against the spending limit for that particular account. Thus, the present invention allows the user to make real-time, informed spending decisions in accordance with the user's defined budget limits and in an intuitive and simple manner.

The present invention is operable in an automated environment potentially including a personal computer, laptop computer, PDA, mobile phone, smart phone, or other computer-type device that includes a central processing unit, memory means, input and output means, and optional data communication means. The data communication means may be used to connect directly to an entity such as a financial institution; it may also be used to connect to various entities through the Internet or any other type of network. In a preferred embodiment, transactions can be reconciled and various documents such as job quotes, purchase orders, and time sheets can be transmitted remotely by fax or by other electronic means. Preferably, the present invention includes one or more wireless data communication means to accommodate the user's need for mobility.

The preferred embodiments of the present invention allow the user to retrieve real-time financial transaction information from a financial institution, thereby providing accurate, up-to-the-minute information with respect to payments authorized, checks cleared, and deposits made. An embodiment of the present invention also lets the user pay bills online using the various virtual spending accounts in conjunction with the actual accounts.

Hence, a method and system is provided for simplified and intuitive budget/spending management of a business that allows a user involved in several projects or jobs to be aware, in real-time, of the allocation of resources amongst various categories of transactions. As such, the present invention enables users to make better informed, proactive spending decisions and provide greater control over a business' financial condition. In particular, but by way of example and not of limitation, the present invention is well-suited for a sole proprietor of a construction business who is out in the field much of the work day and needs mobile, real-time access to his or her financial information.

Accordingly, it is an object of some embodiments of the present invention to provide an automated method and system for job-based budget management of a business.

Another object of some embodiments of the present invention is to provide remote-access, real-time tracking of financial information in order to facilitate informed, on-the-go spending decisions.

A further object of some embodiments of the present invention is to provide a automated budgeting/spending method that enables a user to remotely manage his or her resources in accordance with a job-based budget each time a spending decision is made.

Another object of some embodiments of the present invention is to provide a double layer of virtual spending accounts, comprising job accounts and allocation accounts, that a user may set individual spending limits for.

Yet another object of some embodiments of the present invention is to provide a job-based virtual structure corresponding to a user-defined budget that is simple, intuitive, and one that non-accounting professionals can easily learn and use.

Another object of some embodiments of the present invention is to provide a financial budgeting and job cost estimating system that facilitates the transmittal and receipt of job estimates or quotes.

A further object of some embodiments of the present invention is to provide a job cost estimating, purchasing, invoicing, time sheet recording, and payroll system that is particularly useful for contractors and businesses that receive or provide job estimates or quotes.

These and other objects and features of the present invention will become more fully apparent from the following description, drawings, and the appended claims. Other objects will likewise become apparent from the practice of the invention as set forth hereafter.

BRIEF DESCRIPTION OF THE DRAWINGS

The foregoing and other objects and features of the present invention will become more fully apparent from the accompanying drawings when considered in conjunction with the following description and appended claims. Although the drawings depict only typical embodiments of the invention and are thus not to be deemed limiting of the invention's scope, the accompanying drawings help explain the invention in added detail.

FIG. 1a shows a diagram of various entities that might be interconnected in one embodiment of a computer environment of the present invention;

FIG. 1b is a diagram showing an example of some computer-type devices that might be included in the computer environment of the present invention;

FIG. 1c is a block diagram of a typical computer-type device that might be included in the computer environment of the present invention;

DETAILED DESCRIPTION OF THE PREFERRED EMBODIMENTS

The figures listed above are expressly incorporated as part of this detailed description.

It is emphasized that the present invention, as illustrated in the figures and description herein, can be embodied or performed in a wide variety of ways. Thus, neither the drawings nor the following more detailed description of the various embodiments of the system and method of the present invention limit the scope of the invention. The drawings and detailed description are merely representative of the particular embodiments of the invention; the substantive scope of the present invention is limited only by the appended claims.

The various embodiments of the invention will be best understood by reference to the drawings, wherein like elements are designated by like alphanumeric characters throughout. Moreover, it should be noted that because the present invention is computer implemented, particular embodiments may range from computer executable instructions as part of computer readable media to hardware used in any or all of the following depicted structures. Implementation may additionally be combinations of hardware and computer executable instructions.

Further, when the invention is described in the context of computer readable media having computer executable instructions stored thereon, it is emphasized that the instructions include program modules, routines, programs, objects, components, data structures, etc. that perform particular tasks or implement particular abstract data types upon or within various structures of the computing environment. Executable instructions may comprise instructions and data which cause a general purpose computer, special purpose computer, or special purpose processing device to perform a certain function or group of functions.

In addition, computer readable media may comprise any available media which can be accessed by a general purpose or special purpose computer. By way of example and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above should also be included within the scope of computer readable media. For brevity, computer readable media having computer executable instructions may sometimes be referred to as "software" or "computer software."

Figure 1A:
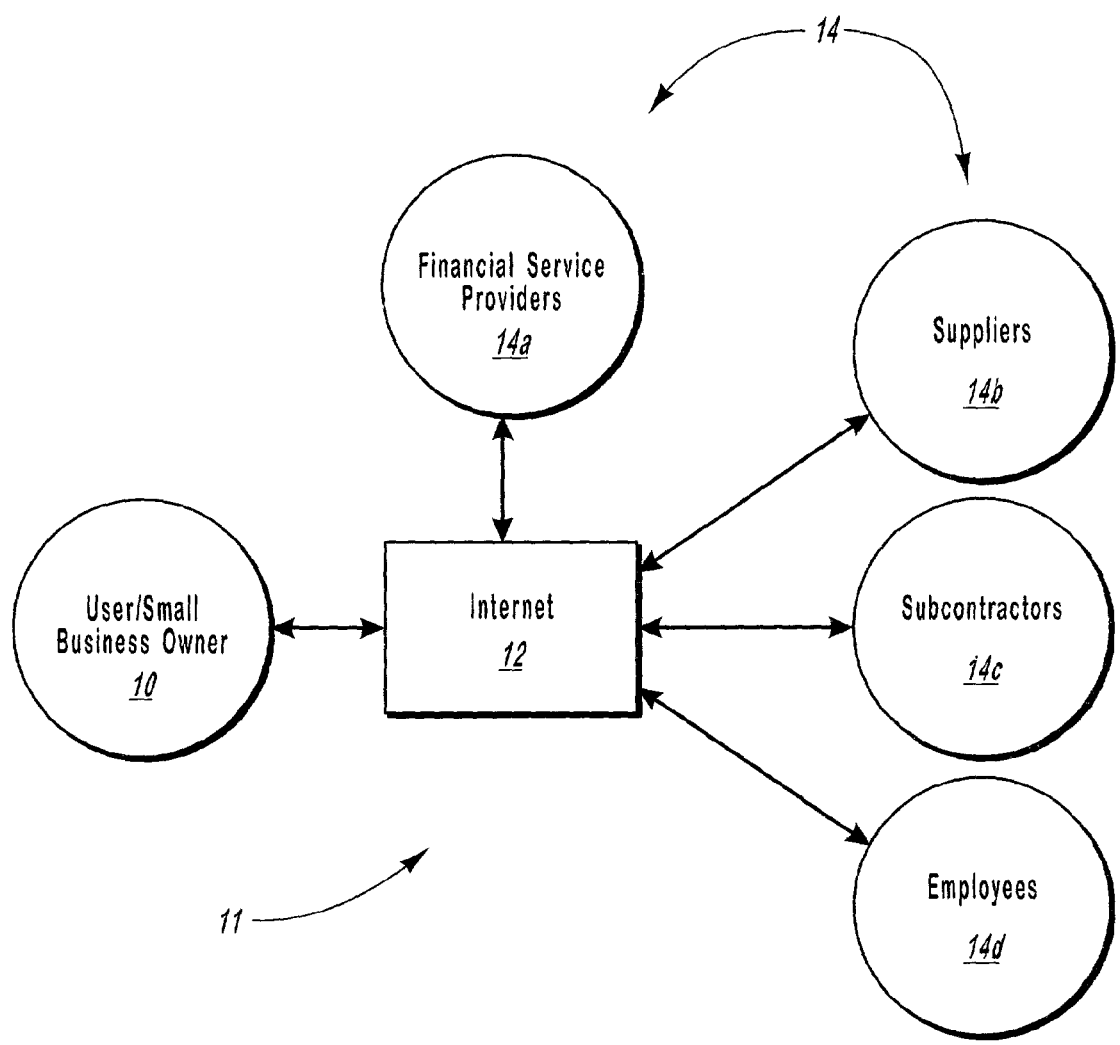
FIGS. 1a through 1c illustrate an example of a computer environment in which the present invention typically operates.
Figure 1B:
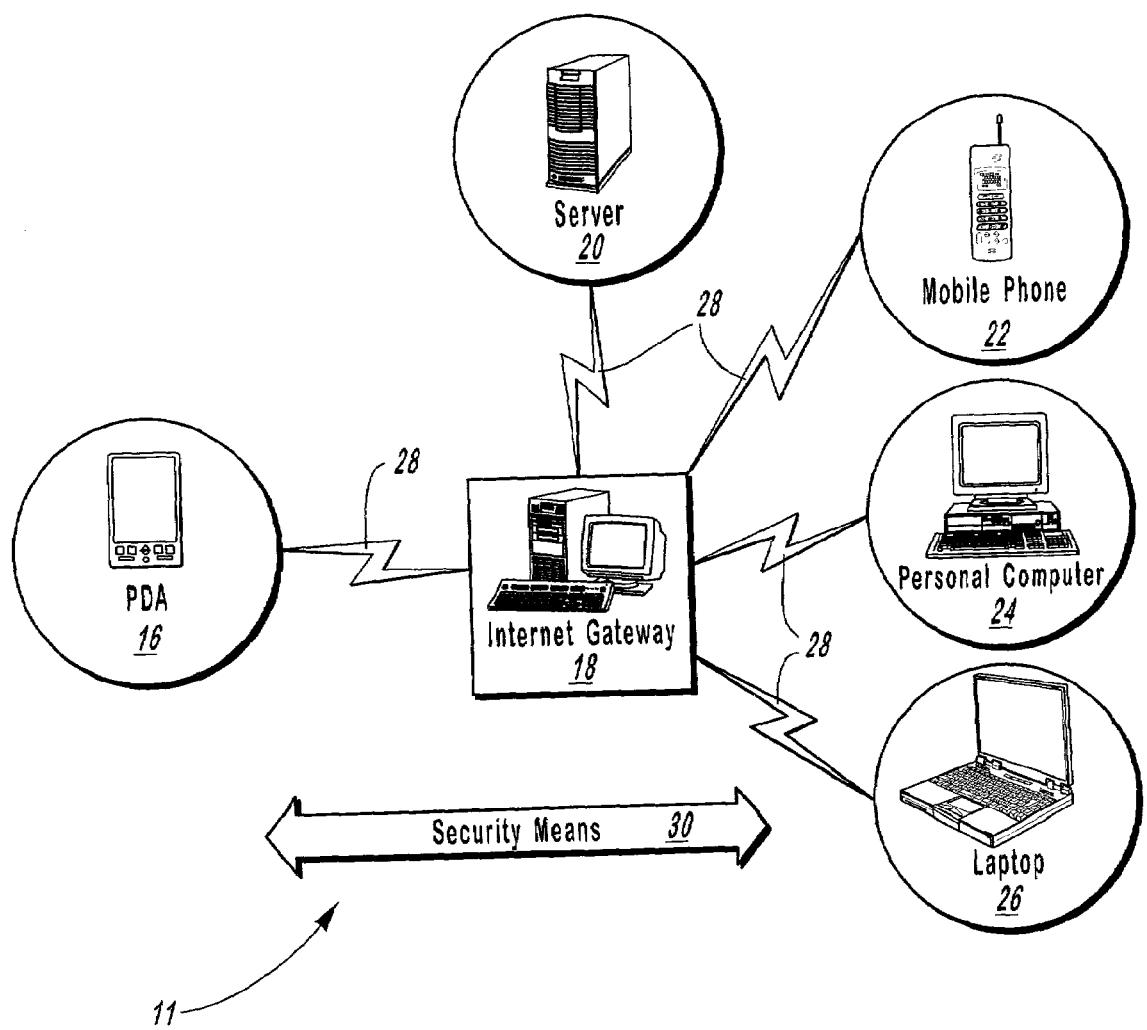

With reference now to the accompanying drawings, FIGS. 1a and 1b show a computer-based environment 11 in which one embodiment of the present invention typically operates. In these figures, for purposes of illustration, the user is represented by a small business owner 10 who may be a sole proprietor of a construction business. Note that although the user 10 is here illustrated by a small business owner, the user 10 can be any individual, business, or entity that needs to manage the income and outgo of resources. It should also be noted that the present invention is particularly suitable for businesses that provide services or products on a job-by-job basis. Examples of such job-based businesses include contracting businesses, consulting businesses, and job shops.

FIG. 1a shows various entities that may be connected to each other in a computer-based environment 11. In FIG. 1a, user 10 preferably communicates via the Internet 12 with other entities, represented generally at 14. The entities 14 may comprise financial service providers 14a such as banks, credit unions, investment groups, and credit card companies; suppliers 14b such as merchants who supply business inventory or equipment; independent contractors or subcontractors 14c; and employees 14d.

FIG. 1b shows an example of some computer-type devices used in a typical computer-based environment 11 of the present invention. In a preferred embodiment, the user 10 and various entities 14 are connected to each other via an Internet gateway 18 which typically comprises a computer system used for managing Internet access and web interaction. The gateway 18 allows the user 10 to communicate with the various entities 14.

Figure 1C:
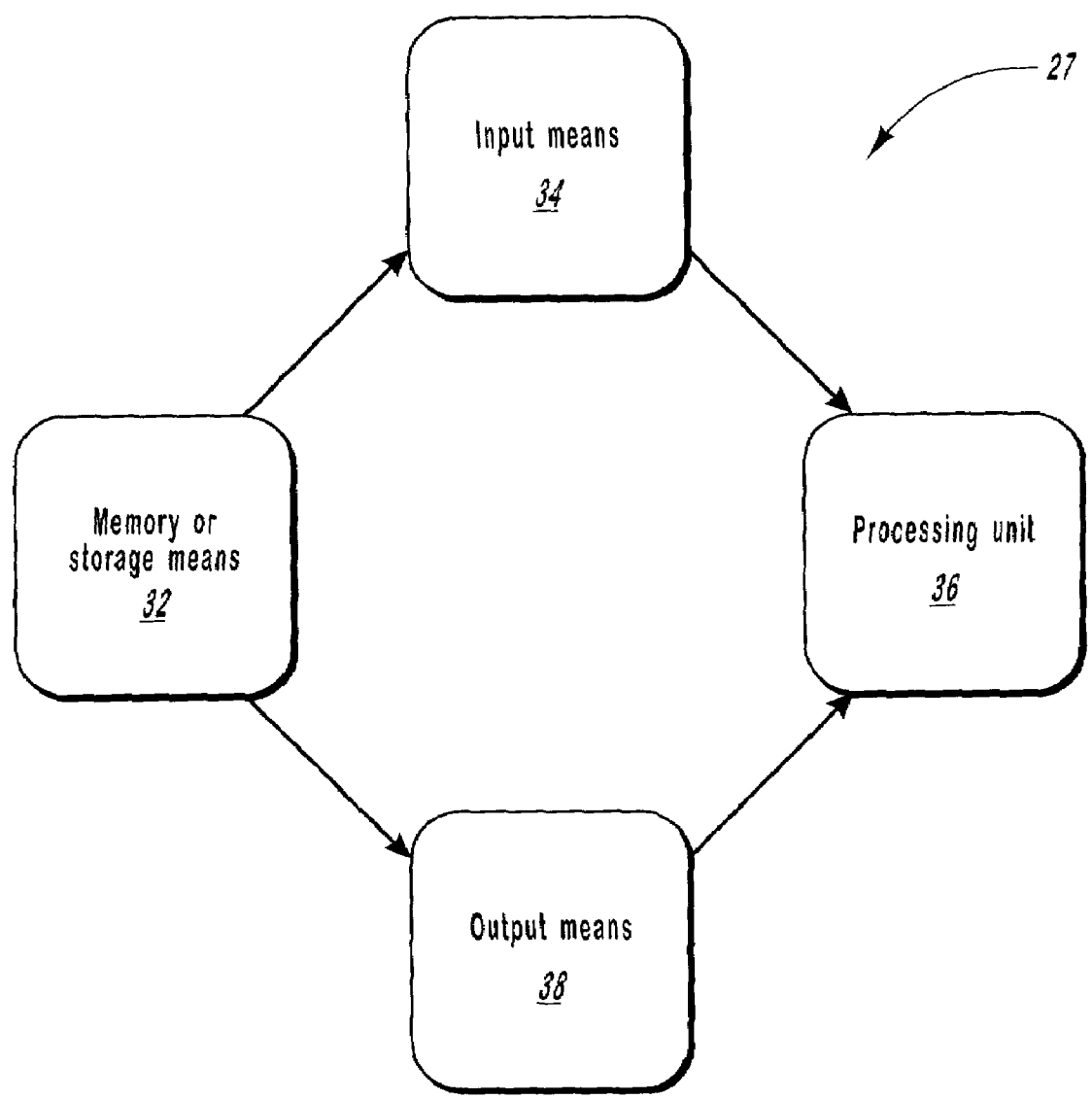

FIG. 1b further shows the computer-type devices that a user 10 and entities 14 may use to connect to the gateway 18 and interact with each other. In a preferred embodiment of the present invention, the user 10 uses a PDA 16 to communicate with the gateway 18 and other entities 14. A user 10 or entity 14 may also use one or more computer-type devices such as a server 20, a mobile phone or smart phone (including an Internet-based cell phone) 22, a personal computer 24, a laptop computer 26, or other computer-type device. FIG. 1c shows the basic structure of a typical computer-type device 27. This structure includes a processing unit 36, a memory or storage means 32, an input means 34, and an output means 38. As was mentioned above, memory or storage means 32 can include RAM, ROM, EEPROM, CD-ROM or other optical disk storage, magnetic disk storage or other magnetic disk storage devices, or any other storage medium. Other storage means 32 might include magnetic cassettes, flash memory cards, digital video disks, removable disks, Bernoulli cartridges, or the like. Input means 34 may include a keyboard, a pointing device (e.g., a mouse, touch pad, track ball, joystick, or stylus), a microphone, scanner, or the like. Examples of output means 38 include a monitor, a printer, a plotter, a fax, and speakers. The processing unit 36 can include a general purpose processor or special purpose processor.

The user 10 and entities 14 connect to the gateway 18 via data communication means, shown generally at 28 in FIG. 1b, which may comprise a wireless means, a wire line, a cable modem, satellite dish, or other such communication means. Preferably, the communication means 28 employed by the user 10 is a wireless means that allows the user 10 to remotely access the gateway 18 or other entities 14. Although the user 10 and entities 14 are typically networked together via the Internet, the present invention also contemplates connection via a local-area network (LAN) system or other communication system where the user 10 and one or more entities 14 are connected directly to one another. Data communication means 28 typically further includes a network adaptor or modem for establishing connection to a LAN system or to the Internet.

Various protocols may be used for communication between the user 10, entities 14, and gateway 18. For example, a user 10 using a PDA preferably communicates via a wireless protocol. Also, in a preferred embodiment, the gateway 18 provides a platform that transforms data suitable for use in a wide variety of wireless networks including, e.g., Code Division Multiple Access (CDMA), Global System for Mobile Communication (GSM), Time Division Multiple Access (TDMA), Cellular Digital Packet Data (CDPD), Mobitex, and Internet Protocol. In a preferred embodiment, the gateway 18 also includes a server that communicates with one or more of the financial service providers 14a using protocols such as Open Financial Exchange (OXF) or Extensible Markup Language (XML). Gateway 18 is preferably extendable across a wide variety of protocols, operating systems, and networks. Moreover, the gateway 18 preferably incorporates a data security means 30 so that data (for example, financial transactions) communicated through the gateway 18 is secured from access by unauthorized intruders. In a preferred embodiment of the present invention, the data security means 30 includes a user ID and password mechanism as well as standard cryptology protocols such as Secure Socket Layer (SSL) and Transport Layer Security (TLS). A preferred embodiment also contemplates the use of Public Key Infrastructure (PKI) technology that supports digital signatures.

Figure 2:
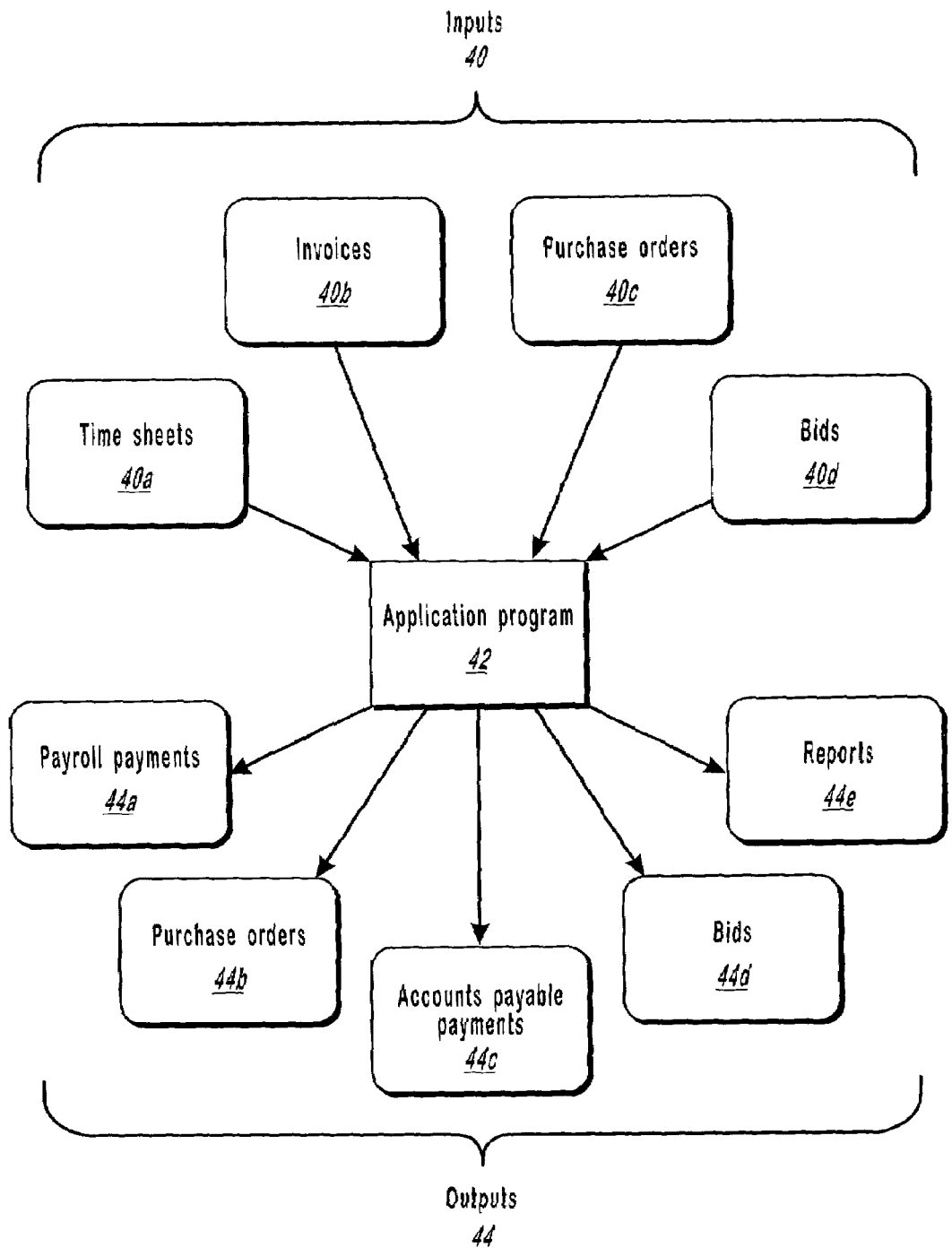
FIG. 2 is a block diagram illustrating a variety of possible types of inputs and outputs with respect to one embodiment of the present invention.

FIG. 2 shows an application program 42 that is preferably a software package or module that provides an interface whereby the user 10 manages and budgets his or her resources according to the method of the present invention. Application program 42 can integrally incorporate a database module or simply provide the interface that operates upon information held in an external database. Application 42 can also be designed to either include or interact with other modules or applications such as applications that are designed to organize or analyze actual financial information. Examples of such modules or applications might include: applications that provide for automatic bank and credit card account tracking and reconciliation; applications that provide for on-line bill payment (both automatic and user-instigated); applications that allow bills to be presented on-line; applications that let a user make payments via e-mail; applications that provide point-of-sale tools; applications providing a personal credit card processing tool; applications providing customized automatic reports; applications that allow a user to conduct on-line financial transactions with another entity such as a financial institution or a merchant; and applications that provide traditional financial accounting analysis and reports—e.g., Quicken® by INTUIT, of Menlo Park, Calif., and Money® by Microsoft, of Redmond, Wash. In one embodiment, application 42 incorporates all of the above features within itself rather than by interacting with external applications that provide those features.

Application 42 preferably operates in a graphical user interface (GUI) environment where the user 10 can manipulate data and information using pointing devices such as a mouse, roller ball, or PDA stylus. As such, application 42 typically operates within a Windows-type environment (e.g., Windows '95, MAC, Palm OS, HTML-, JAVA-, or EPOC-based platform-independent environments). The application 42 may be web-based or "native" to a particular computer device's operating system.

Application program or module 42 may reside in various storage areas within a computer-based environment 11 along with other program modules such as an operating system, one or more application programs, other program modules, and program data. Moreover, any application programs, program modules, or data in the computer-based environment 11—including application 42—may be stored in whole or in part in a local or remote computer storage device as well as may be linked to various processing devices that perform specific processing tasks.

In addition to the application program 42, FIG. 2 also depicts typical inputs 40 and outputs 44 that may interact with application program 42. Examples of such inputs 40 include time sheets 40*a*, invoices 40*b*, purchase orders 40*c*, and bids (including job estimates or quotes) 40*d*. Examples of typical outputs 44 include payroll payments 44*a*, purchase orders 44*b*, accounts payable payments 44*c*, bids 44*d*, and reports 44*e*. The inputs 40 may be input into the application program 42 in a variety of ways. For example, the inputs 40 may be input by either a user 10 or a connected entity 14 who sends it electronically to the user 10 via fax, e-mail, Internet web sites (e.g., by filling out and uploading an electronic form provided by a web site) or other electronic means. Alternatively, the inputs 40 may be received by an entity 14 in hard copy form by the user 10 who then may input the received information using, for example, a scanner and scanning software or by manually typing in the information. The outputs 44 may also be generated electronically, in hard copy format, or both. Inputs 40 and outputs 44 may include voice inputs and outputs as well as any other type of electronically transmittable media. The manner of processing these inputs 40 and outputs 44 will be further explained herein.

Among the various types of possible reports 44*e*, application 42 preferably can generate various accounting and budget status reports-whether upon request by the user 10 or customized to do so automatically at regular intervals or upon the happening of some specified event. In some embodiments, these reports 44*e* can be based upon the user's request to see a cash flow statement; to see transactions related to an individual virtual spending account or transactions made with a particular payee; or to provide reconciliation reports between an actual account statement from a financial institution and the user's personal transaction record. Further, the system can generate a spending report showing the spending status versus the budget allocated for each of the virtual accounts. The reports 44*e* can also include reports for any particular actual account or for the entire system of accounts both actual and virtual. The reports 44*e* can also be generated in various formats such as in the form of text, graphs, charts, voice or sound output, etc. Such reports can be set to generate automatically or upon the instigation of user 10.

Figure 3:
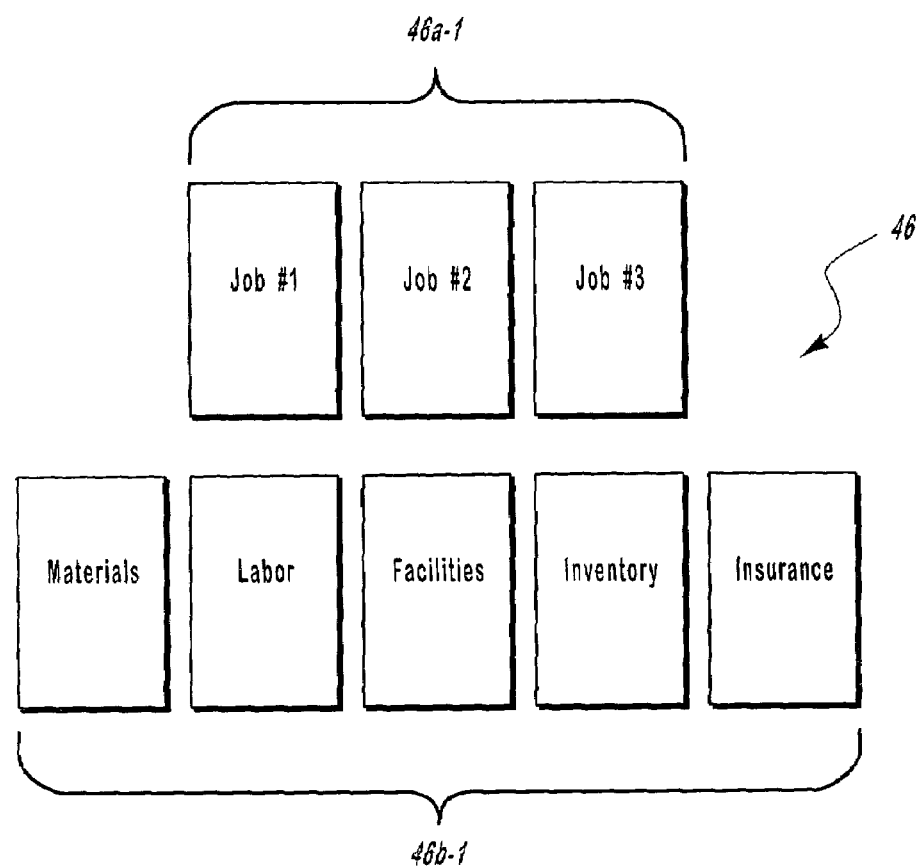
FIG. 3 is a block diagram illustrating a plurality of virtual spending accounts established by a user in accordance with one embodiment of the present invention.

With reference now to FIG. 3, the block diagram therein represents a plurality of user-defined virtual envelopes or spending accounts 46 set up by a user 10 (or provided by default in the application program 42) in accordance with one embodiment of the present invention. In the preferred embodiments, the virtual spending accounts 46 include two types: job accounts 46*a*-1 and allocation accounts 46*b*-1. Job accounts 46*a*-1 represent individual jobs or projects that the user 10 sets up. For example, a user 10 who is a contractor might set up "Job#1" to represent a particular subcontract. Likewise, the owner might set up "Job#2" and "Job#3" to represent other subcontracts.

As for the allocation accounts 46*b*-1, the user 10 might set up various categories of spending such as those shown in FIG. 3: materials, labor, facilities, inventory, and insurance. For example, the "materials" allocation account might be set up to represent the user's transactions with respect to purchases of materials. The "labor" allocation account might be set up to represent transactions concerning employee and subcontractor costs such as taxes, salaries, workers compensation, and other forms of compensation. The "facilities" allocation account could represent transactions with respect to costs such as a lease of a building, utilities, mortgage payments, or repairs done on the user's facilities. The "inventory" allocation account could represent transactions concerning the purchase and sale of inventory. The "insurance" allocation account could represent transactions with respect to the payment for and receipt of insurance benefits. These allocation accounts 46*b*-1 are simply examples of possible allocation accounts that a user 10 may choose to set up.

Thus, the virtual accounts 46 comprise two layers of interrelated accounts that aid the user 10 in managing his or her business: job accounts 46*a*-1 and allocation accounts 46*b*-1. In some embodiments of the invention, the virtual spending accounts 46 may further include sub-accounts representing various subcategories of the respective parent accounts (e.g., the "materials" account may be subdivided into sub-accounts comprising Vendor A, Vendor B, and Vendor C).

Figure 4:
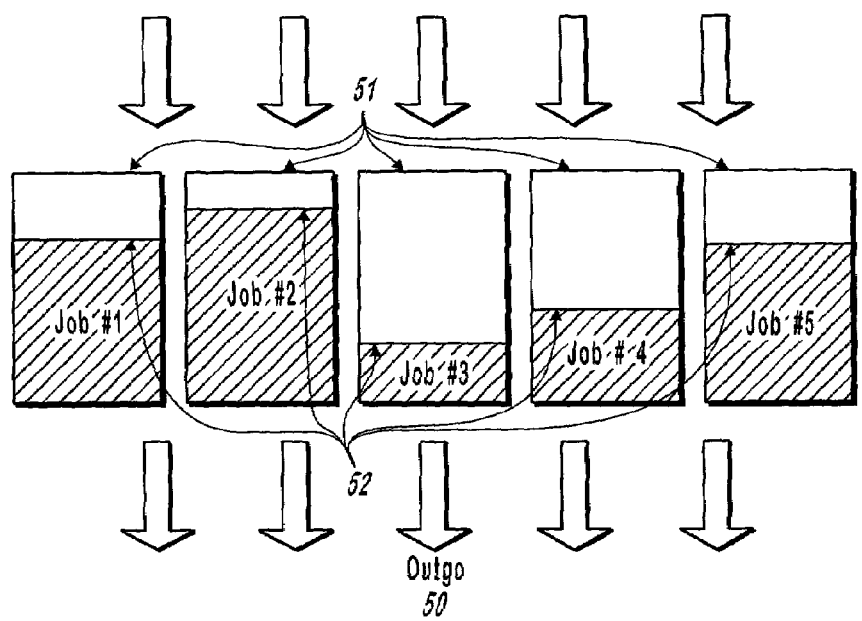
FIG. 4 is a block diagram illustrating the manner in which virtual spending accounts operate in accordance with one embodiment of the present invention.

FIG. 4 shows the manner in which the virtual spending accounts 46, the ones shown here being job accounts 46*a*-1, operate in accordance with one embodiment of the present invention. Each virtual spending account 46 begins with a user-defined numerical limit or spending limit, here represented visually by line 51. In a preferred embodiment, the spending limits are established when the user creates job bids or quotes (as will be explained below). Each account also has a balance, which, in this example, is represented by line 52. As the user 10 receives income 48 or enters into income-producing transactions, a corresponding amount is allocated to the appropriate spending account or accounts 46, thereby increasing the appropriate balances 52. The allocation can be performed individually by the user 10 or be set up to be performed automatically at regular intervals or upon the occurrence of some specified event. As for outgo 50, when the user 10 makes spending transactions, the user 10 spends from the virtual spending accounts 46, thereby decreasing the balances 52. Again, as with the income transactions 48, the allocation of the outgo 50 may also be set up to take place automatically.

Typically, when the user 10 performs a transaction, the user 10 will choose both the job account 46a-1 that the particular transaction applies to as well as the allocation account 46b-1 to which the transaction is to be attributed, thereby using two layers of virtual accounts 46 to manage transactions. In some embodiments, a transaction may be allocated between more than one job account 46a-1 and/or more than one allocation account 46b-1.

Figure 5A:
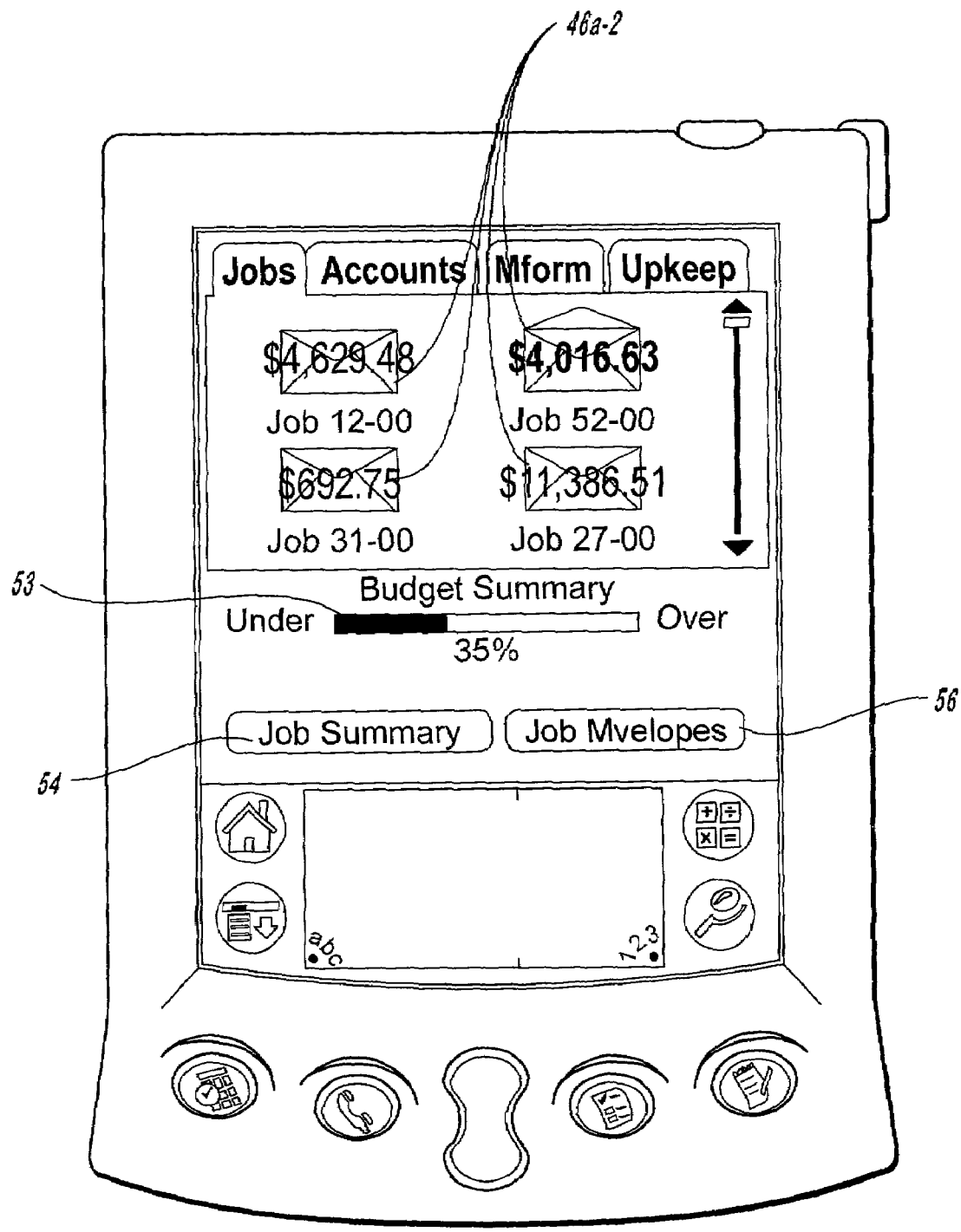
FIGS. 5a through 5p illustrate the method of operation of one embodiment of the present invention.

In the preferred embodiments, the virtual accounts 46 interact with actual accounts 60 (see FIG. 5g) such as savings, checking, and credit accounts held by the user 10. In other words, the virtual spending accounts 46 (both layers—i.e., both the job accounts 46a-1 and the allocation accounts 46b-1) are preferably further "overlaid" over actual accounts 60 so that transactions from the virtual accounts 46 are simultaneously debited or credited from the actual accounts 60 held by the user 10. This synchronization may be programmed to take place automatically or upon user instigation. Moreover, in some embodiments of the invention, the user 10 may mark individual transactions by a symbol (such as "R," as shown in FIG. 5e, to represent "reconciled"). In some embodiments of the invention, the latter marking may take place automatically at an appropriate designated time.

The actual accounts 60 are established, in a preferred embodiment, during a set-up procedure where the user 10 is interviewed to select the institution in which the account is held and to provide an "account-friendly" name such as "my checking account" or "our joint checking account." The user 10 also provides a starting balance, a start date, and any online user name and password information that facilitates on-line communication between the financial institution and the user. The virtual accounts 46 may be established in a similar manner. Once the accounts are set up, the user 10 can go back at any time and modify these accounts or add additional accounts. The present invention provides flexibility in that it allows the user to readily make such modifications according to the user's desires.

In some embodiments, the set-up procedure also allows the user 10 to customize his or her account services. Once established, the user's preferences are stored in a unique profile on the network rather than on a specific device. Thereafter, the user 10 may use any Internet-enabled device to access his or her accounts to retrieve information and conduct transactions without repeating the set-up procedure. Changes in preferences made by a user 10 on one device will automatically be reflected on all other devices used by that user 10.

The system and method of the present invention preferably includes a visual representation of the virtual spending accounts 46 and their respective spending limits 51 as well as their balances 52. The visual representation may include, for example, text, graphics, sound, or a combination of any of the latter. FIG. 4 shows one example of a graphical representation of a set of virtual spending accounts 46 with the corresponding balance 52 in the respective accounts juxtaposed against a graphical representation of the individual spending limits 51 so as to provide a simple and intuitive visual comparison for the user 10. In another embodiment, a graphical representation of the spending limits 51 could have differing heights for each spending account 46 (in addition to the differing heights represented by the different balances 52) reflecting differing spending limits for each account 46. Any sort of textual or graphic representation comes within the scope of this invention, including pie charts, bar charts, and the like. FIGS. 5a–5p show particular examples of graphical and textual representations of the virtual accounts 46 and their manner of operation according to one preferred embodiment of the present invention.

In some embodiments, the virtual accounts 46 can be modified, for example, to add, delete, or rename the various virtual accounts 46. The spending limits 51 as well as the virtual balances 52 for each of the accounts 46 may also be modifiable. In addition, the balances 52 can be set to reflect only cleared transactions or whatever other specific type of transaction that the user 10 desires. The balances 52 may also be set to reflect all transactions, both submitted and cleared.

The preferred embodiments of the present invention allow the user to retrieve real-time financial transaction information from a financial institution, thereby providing accurate, up-to-the-minute information with respect to payments authorized, checks cleared, and deposits made. An embodiment of the present invention also lets the user pay bills online using the various virtual spending accounts. If desired, the user 10 can go off-line to perform a transaction and then update or synchronize the transaction with the actual accounts when the user goes back on-line. The synchronization can be performed automatically or only when a user 10 so instigates it. Also, a user may enter transactions from a wireless device, such as a PDA, and then synchronize the information with the user's desktop computer at his or her home or office.

Various payments can be made on-line by the user 10. Any type of payments can be configured to be paid automatically by the user 10. In some embodiments, regular, fixed payments (e.g., monthly rent, insurance fees, etc.) made by the user 10 are configured to be paid on-line automatically. Such automatic payments may be configured to automatically allocate to or from the appropriate virtual spending accounts 46.

Other features of the present invention may include optional notification of overspending for each account. Also, some embodiments of the present invention allow the user 10 to view transactions by a user-selected period such as a day, week, month, quarter, year, or any other selected period. In some embodiments, transactions may also be viewed simultaneously with one or more related job groups.

FIGS. 5a through 5p illustrate the method of operation with respect to one preferred embodiment of the present invention. These figures show the invention as embodied in part in a PDA, but any sort of computer-type device or wireless device may be used, including an Internet-enabled cell phone.

FIG. 5a shows a main job screen displaying job accounts 46a-2 as numbered envelope icons with their respective remaining budget balances displayed on top of the icons. When one of the job accounts 46a-2 is selected (here, "Job 52-00" is selected), a budget summary 53 for that job is displayed. The user 10 may also choose to view a detail job summary screen by activating screen button 54. By activating screen button 56, the user 10 may view a job screen showing envelope icons representing allocation accounts 46b-2 pertaining to the above-mentioned selected job account.

Figure 5B:
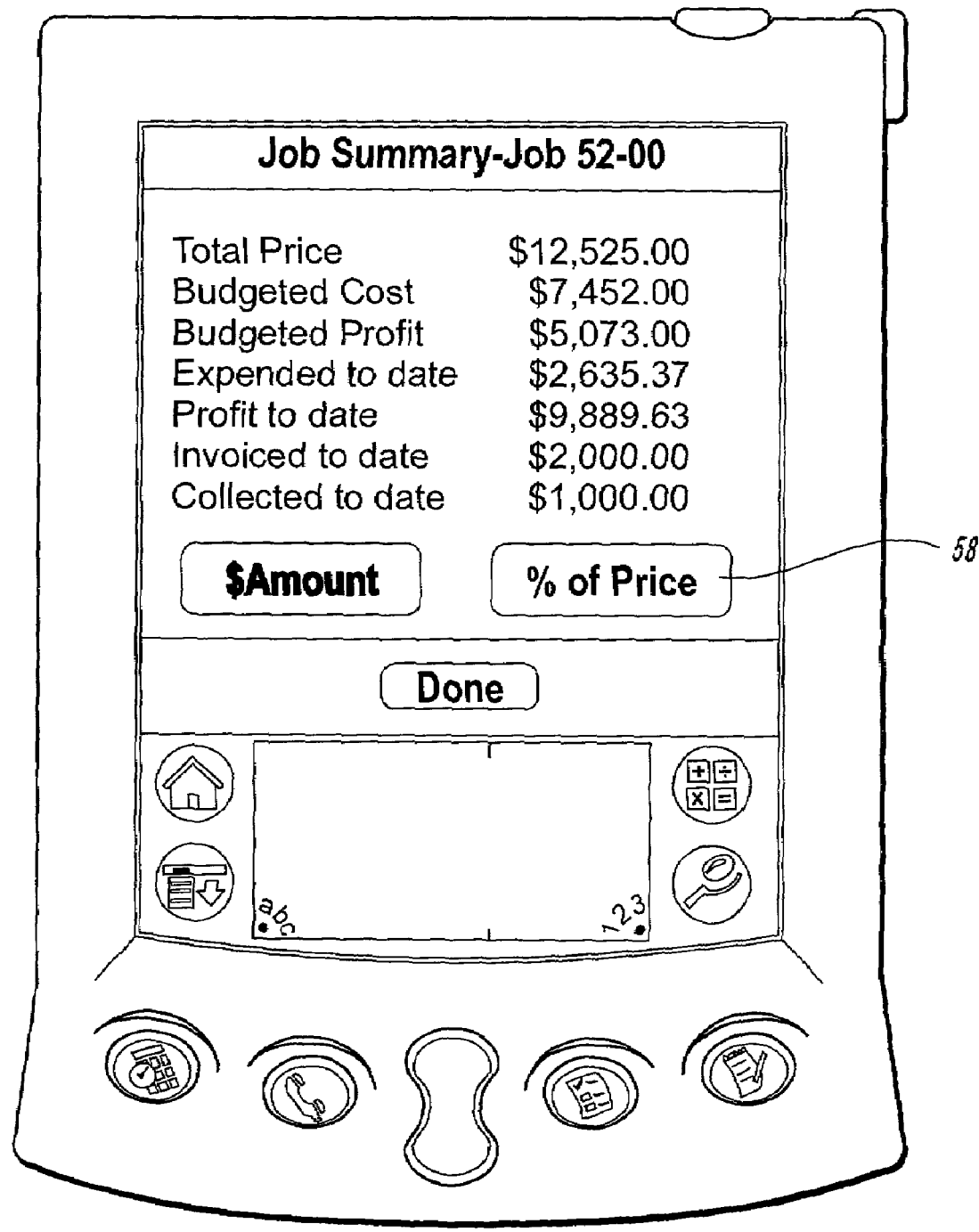
Figure 5C:
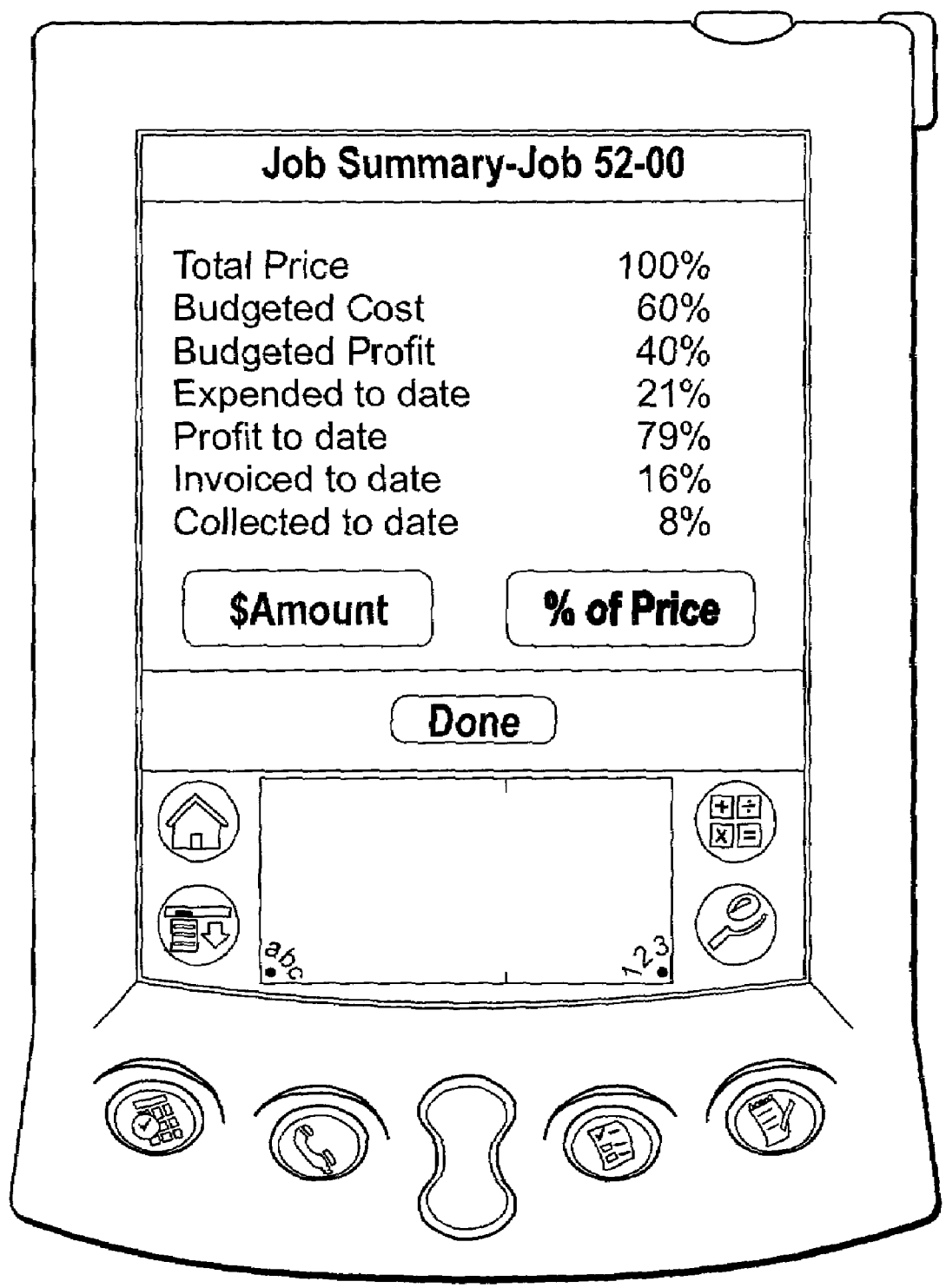

FIG. 5b shows a view of the detail job summary screen that is displayed when screen button 54 (shown in FIG. 5a) is activated. This view shows job detail in dollar amounts, including price, budgeted cost and profit, the total amount expended for that job to date, as well as invoicing and collection history. If a user activates screen button 58, the detail job summary screen indicates the latter information in terms of percentages, as seen in FIG. 5c.

Figure 5D:
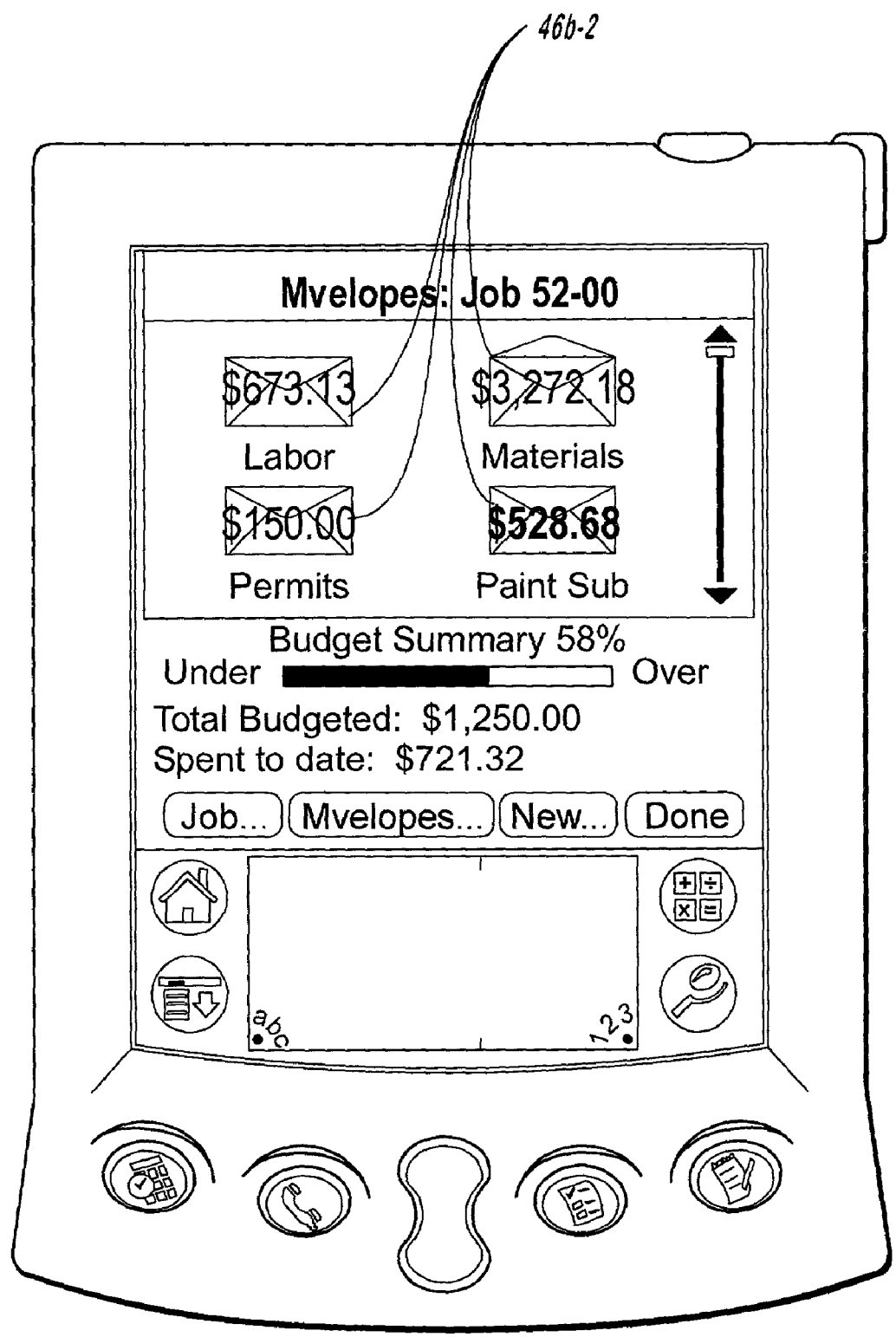
Figure 5E:
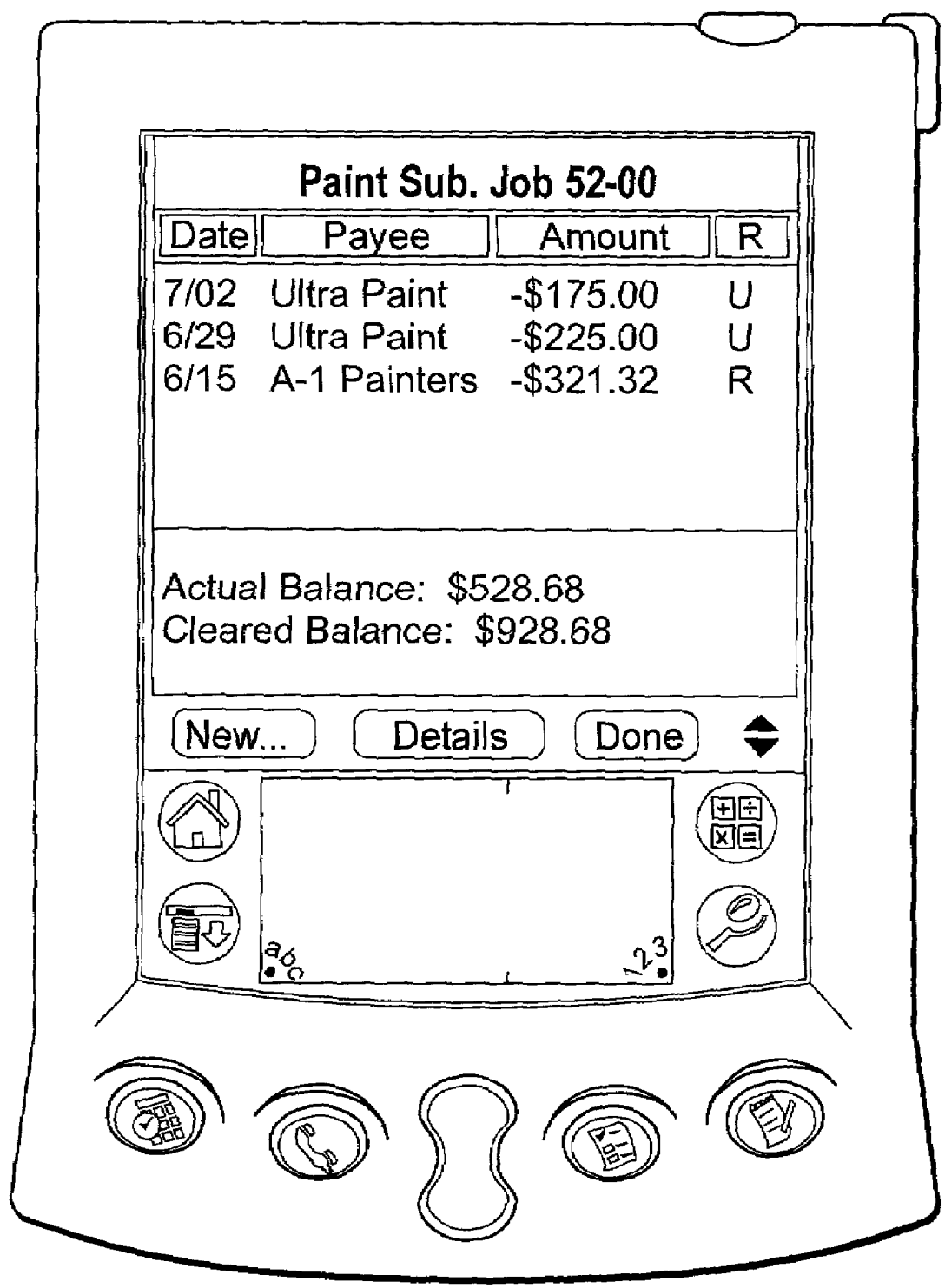

FIG. 5d shows a view of the screen that is displayed for a particular job when button 56 (shown in FIG. 5a) is activated. Here, the virtual allocation accounts 46b-2 are represented by envelope icons labeled "labor," "materials," "permits," and "paint subcontractors." When the user 10 makes transactions with respect to a particular job, those transactions are allocated to the appropriate allocation accounts 46b-2. The allocation accounts 46b-2 represented by the envelope icons are here superimposed by a display of the remaining budget balances for each allocation category. When an envelope icon is selected, summary information is displayed for the selected allocation account. Also, from this screen, the user 10 may choose to view the detail job summary screen, view detail for each virtual allocation account, or enter a new transaction.

FIG. 5e shows a detail screen for the "paint subcontractors" job account shown in FIG. 5d. Here, specific transactions are shown together with the overall actual and cleared balances "U" represents "unreconciled"; "R" represents "reconciled." From this screen, the user 10 may select any transaction and view its related detail.

Figure 5F:
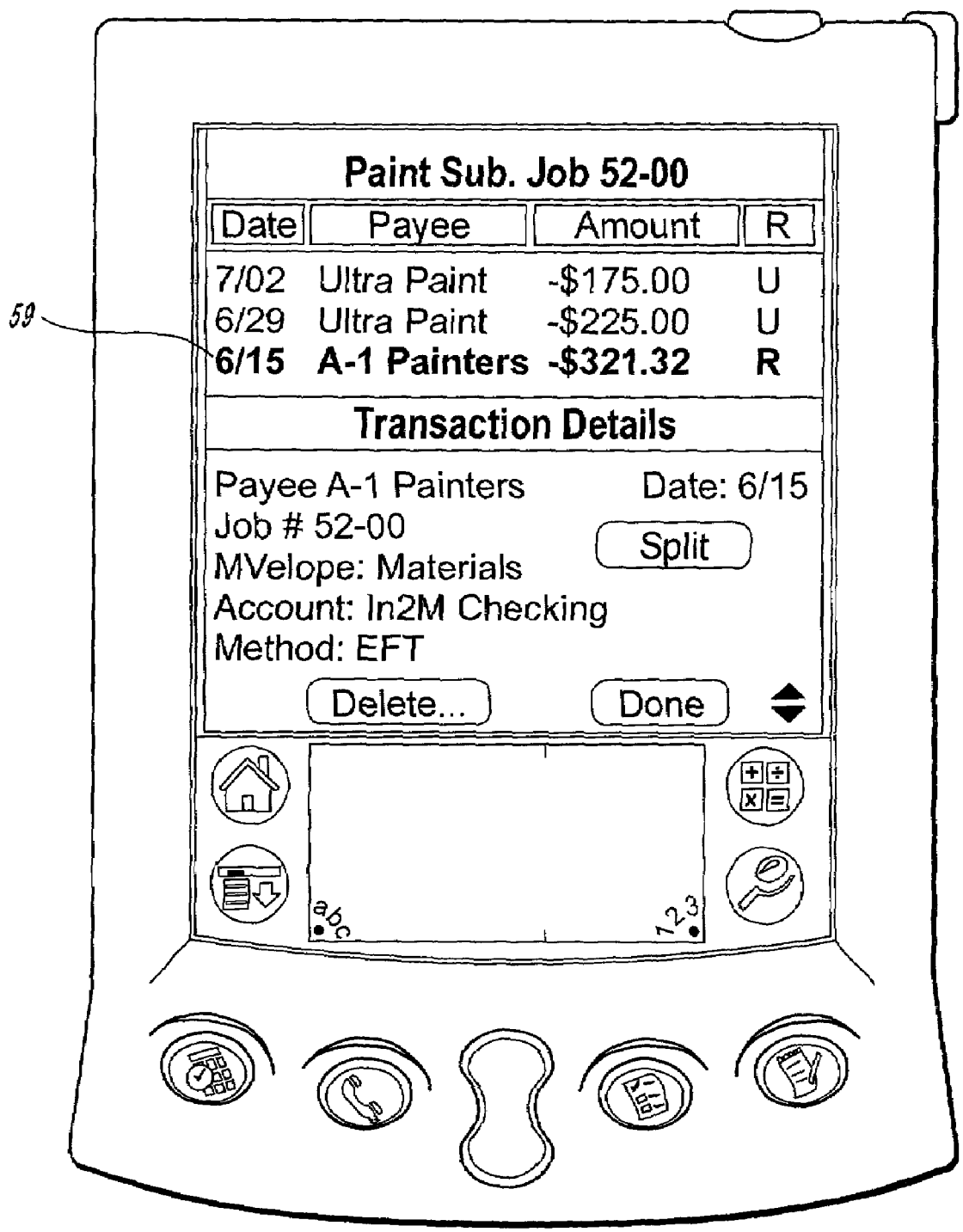

FIG. 5f shows a detail view for a particular transaction 59.

Figure 5G:
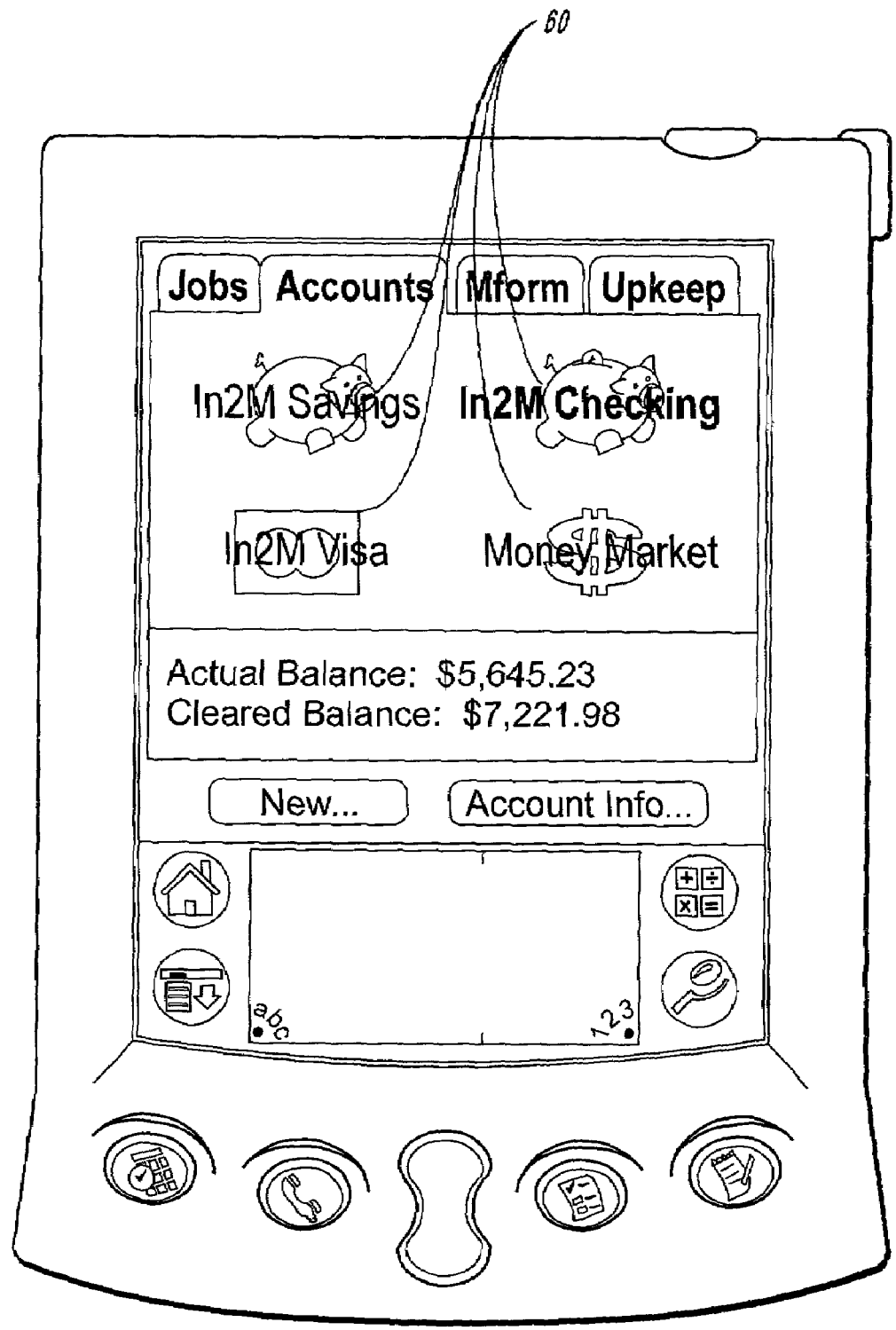

FIG. 5g shows a main accounts screen. This screen shows icons representing actual accounts 60 such as savings, checking, credit card, and money market accounts. When an account is selected (here, the "In2M Checking" is selected), both actual and cleared balances are shown. From this screen, the user 10 may choose to enter a new transaction or view detail information for a selected actual account.

Figure 5H:
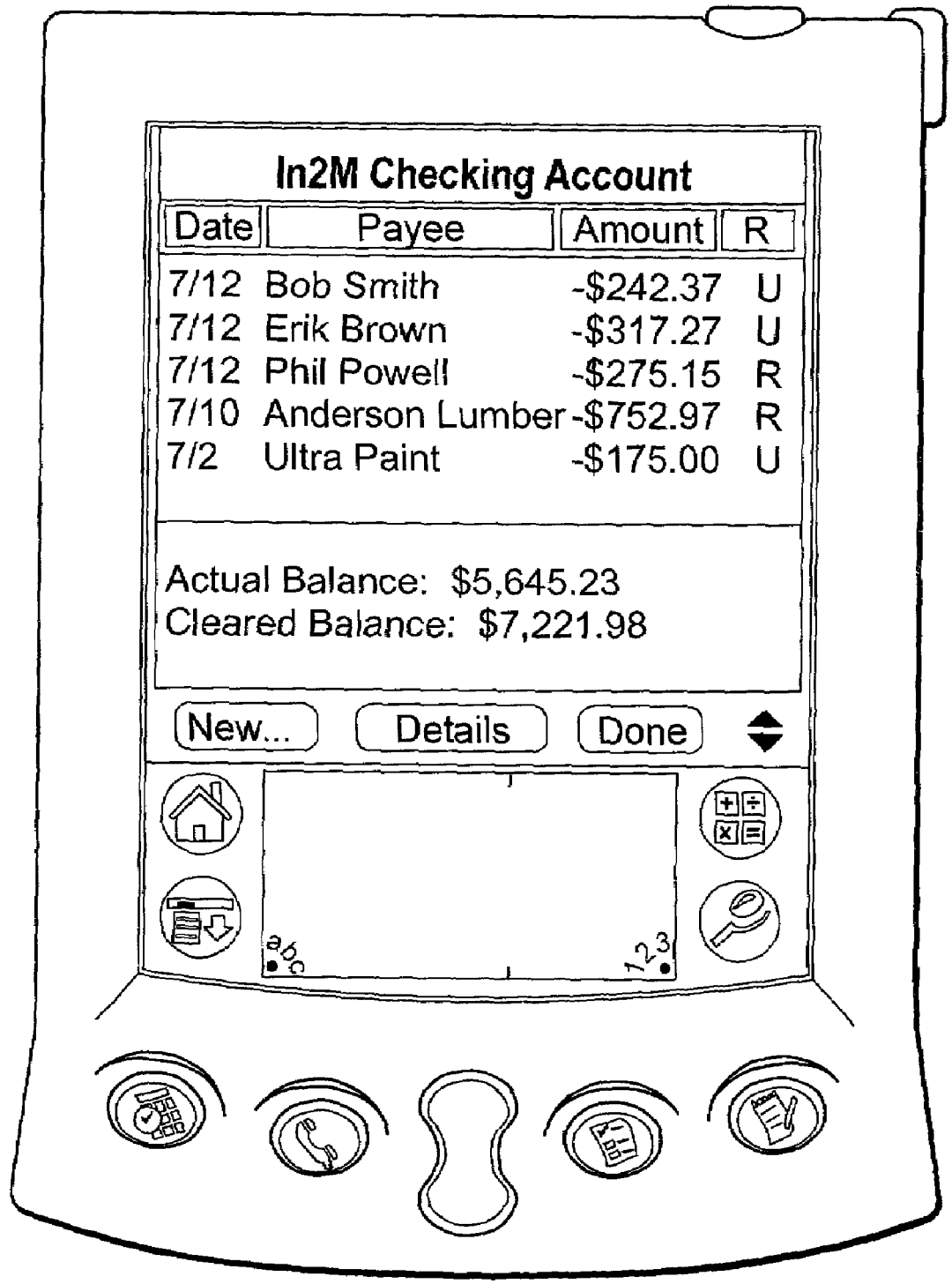

FIG. 5h shows a detail screen of a particular actual account 60, the checking account shown in FIG. 5g. This screen shows the account transactions together with the actual and cleared account balance. From this screen, the user 10 may choose to enter a new transaction or view detail information for a selected transaction.

Figure 5I:
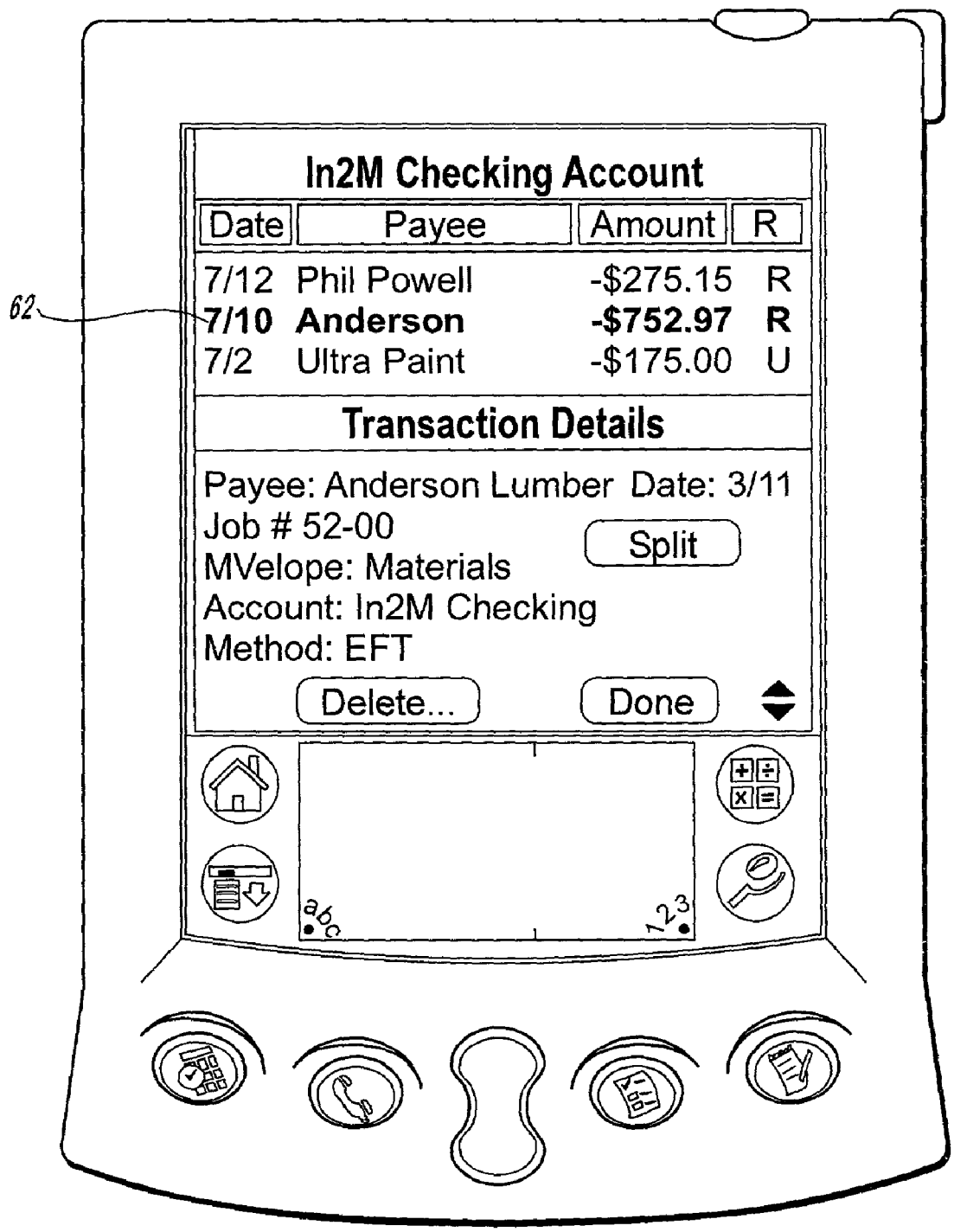

FIG. 5i shows a detail view of a particular transaction 62.

Figure 5J:
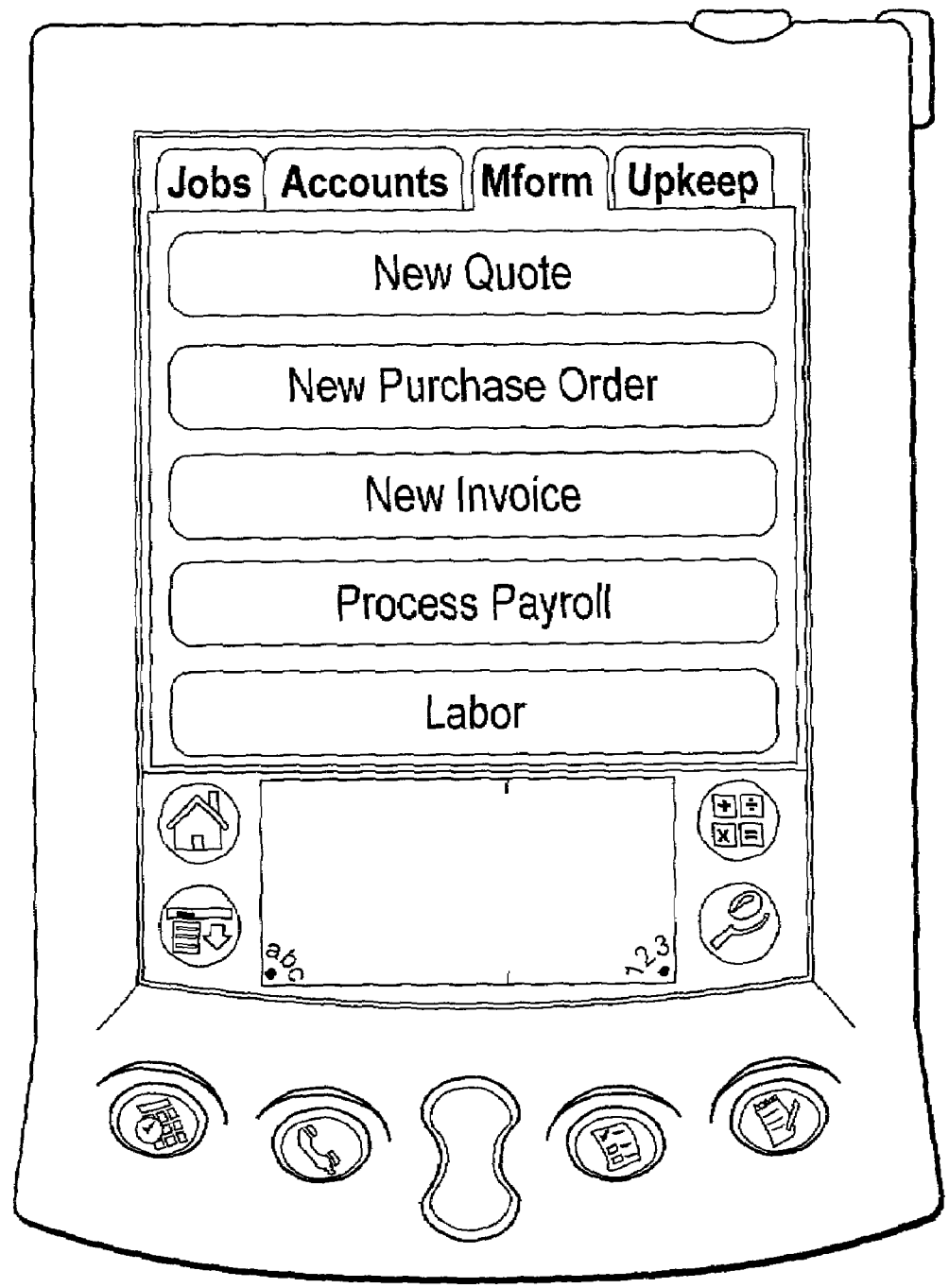

FIG. 5j shows a main screen which allows a user 10 to choose to generate a job quote, a purchase order, or invoice-as mentioned in the above discussion of FIG. 2. The user 10 may also enter the labor screen or process payroll.

Figure 5K:
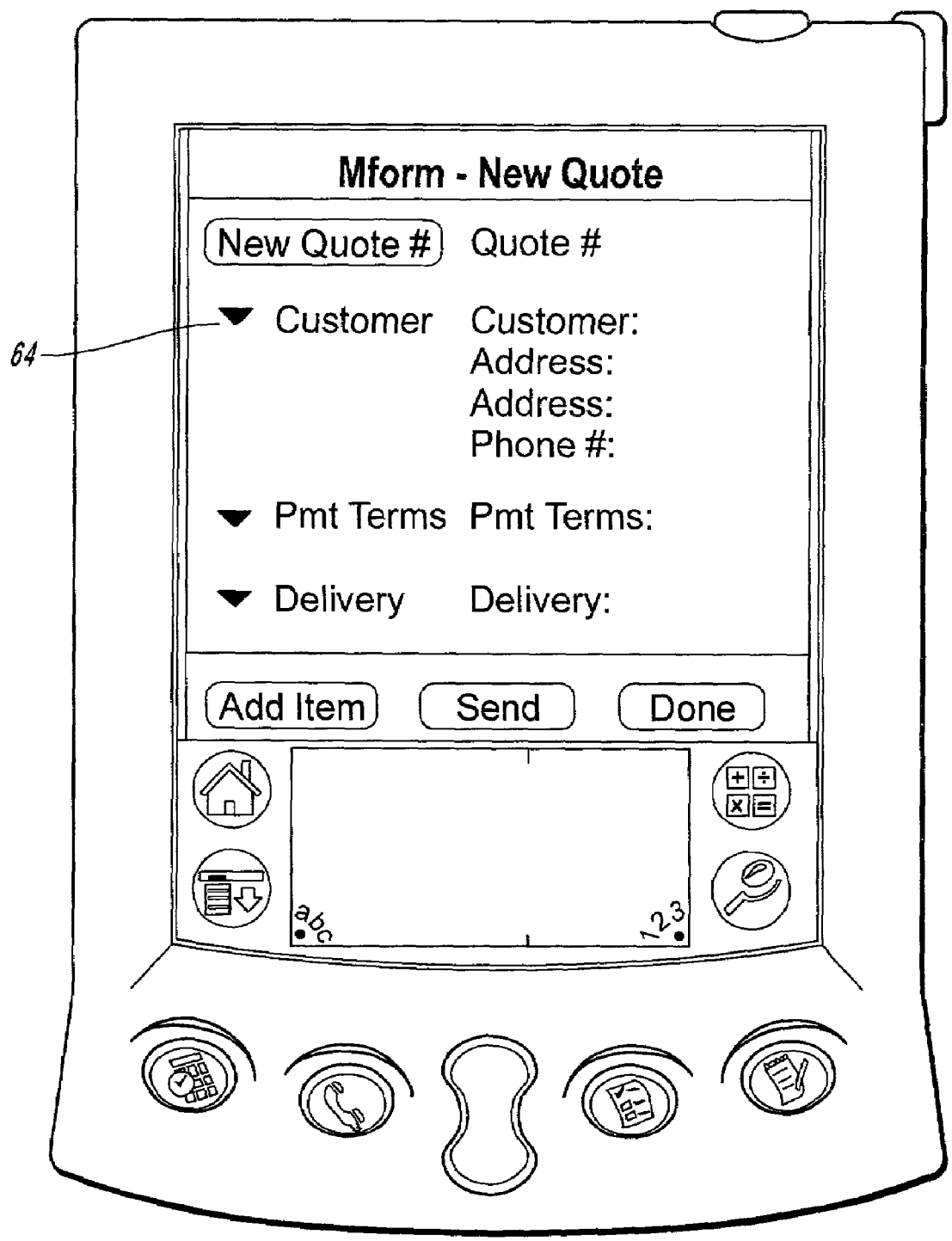
Figure 51:
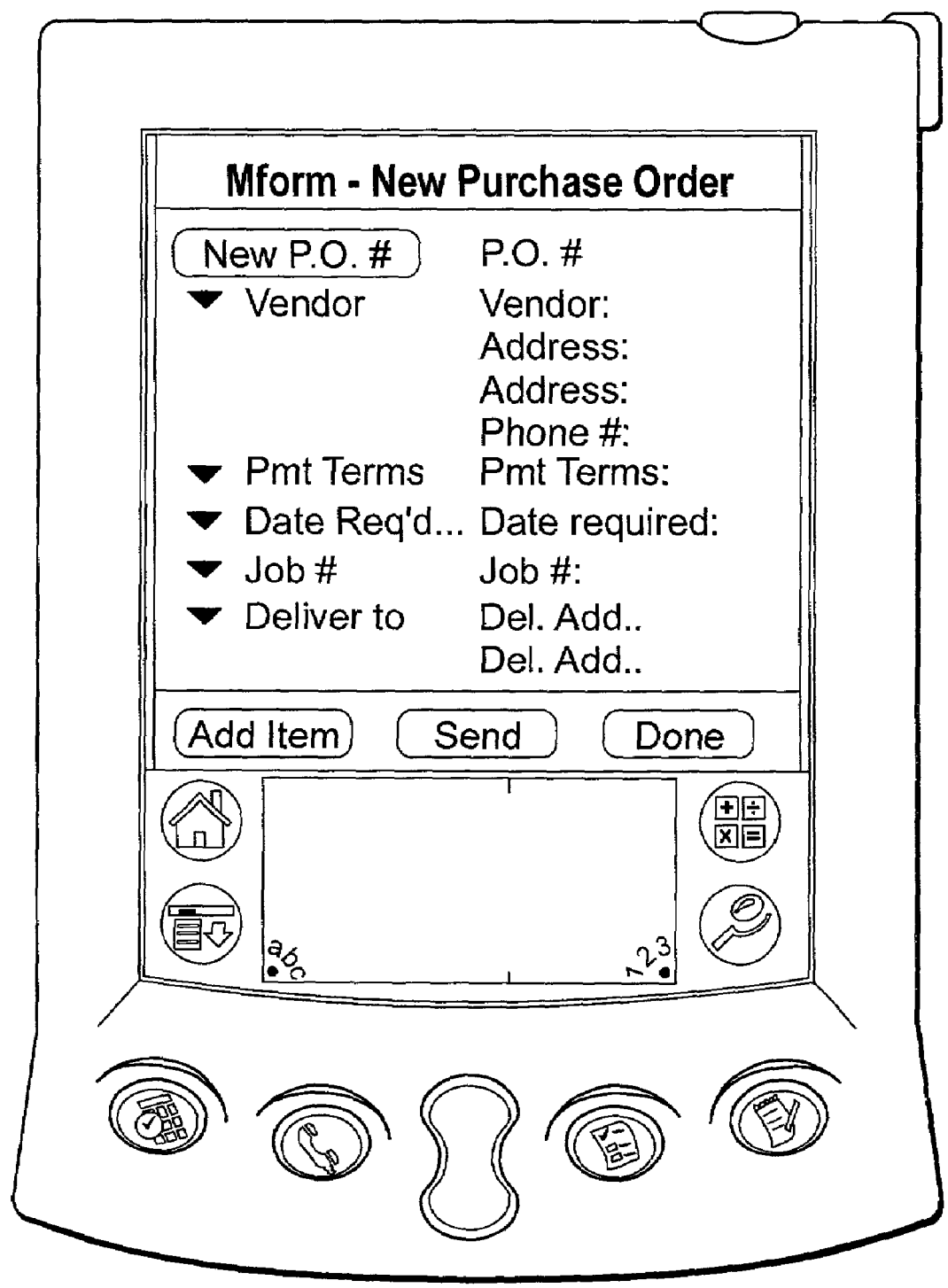

FIG. 5k shows a screen where the user 10 can create job quotes, estimates, or bids 40d (see FIG. 2) by selecting the appropriate information, including payment terms and method of delivery. It should be noted that the user 10 can enter new information or alternatively select from a drop-down pick list that is opened upon activation of triangular icon 64. The items on the pick list are obtained from a list or database that is updated when the user 10 enters new information that is not already in the database.

In the preferred embodiments, job envelopes 46a-2 can originate from the quotations created at the screen shown in FIG. 5k. Once created, these quotations are saved so that they can be transformed into job accounts 46a-2 upon receipt of a contract. For example, when a job quote is created, the user 10 establishes spending limits for the various virtual accounts 46—preferably for that individual job account as a whole as well as for each individual allocation account (i.e., the accounts categorized into "labor," "materials," "permits," etc.). When the quote is approved—i.e., when the quote or bid is accepted by the offeree, thereby creating a contract—the job quote is preferably automatically transformed into a job account having the previously established spending limits. In some embodiments of the invention, job envelopes 46a-2 may alternatively be created directly instead of through the creation of a job estimate or quote.

FIG. 5l shows a screen where the user 10 may create purchase orders by selecting the appropriate information in a similar manner to that explained in conjunction with FIG. 5k. The purchase orders are used to update the job accounts 46a-2. For example, the user 10 may submit purchase orders 44b to a supplier 14b or subcontractor 14c remotely by fax, e-mail, or other electronic means. In the embodiment shown, when creating the purchase order, the user 10 specifies the job number that the purchase order applies to. Thus, the virtual balance of the corresponding job account is automatically updated to reflect the cost of the purchase order.

Figure 5M:
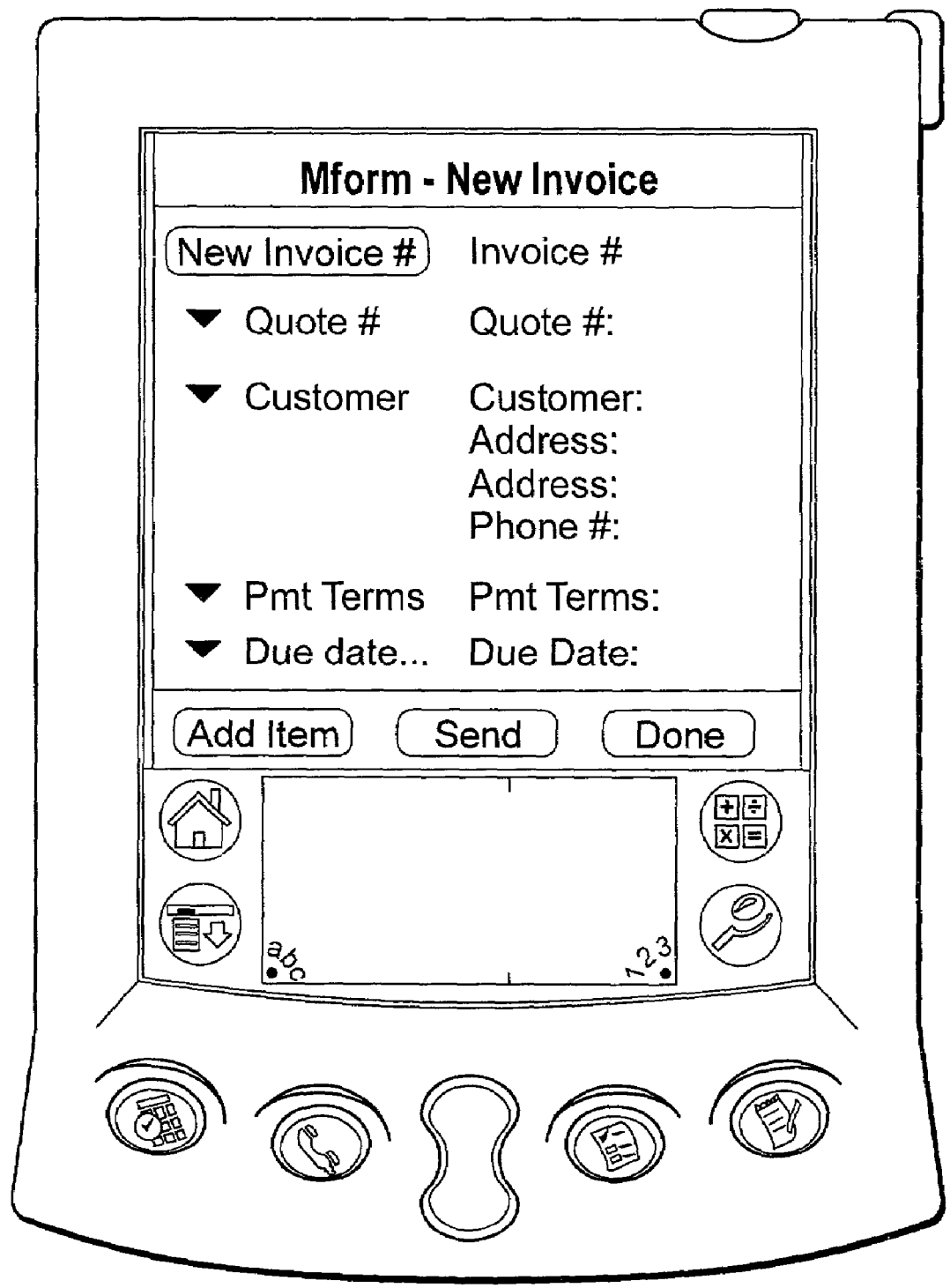

FIG. 5m shows a screen where the user 10 may create invoices 40b by selecting the appropriate information in a similar manner to that explained in conjunction with FIG. 5k. The user 10 may also remotely send invoices just as he or she may remotely transmit purchase orders. In one embodiment, the user 10 may also receive invoices or purchase orders from a supplier 14b or subcontractor 14c (referring back to FIG. 1a). Upon receipt of the invoices or purchase orders, any corresponding invoices and purchase orders may be automatically reconciled. Once reconciled, the appropriate accounts payable payments 44c may be sent to the appropriate party. The payment upon reconciliation and/or release of payment authorization.

Figure 5N:
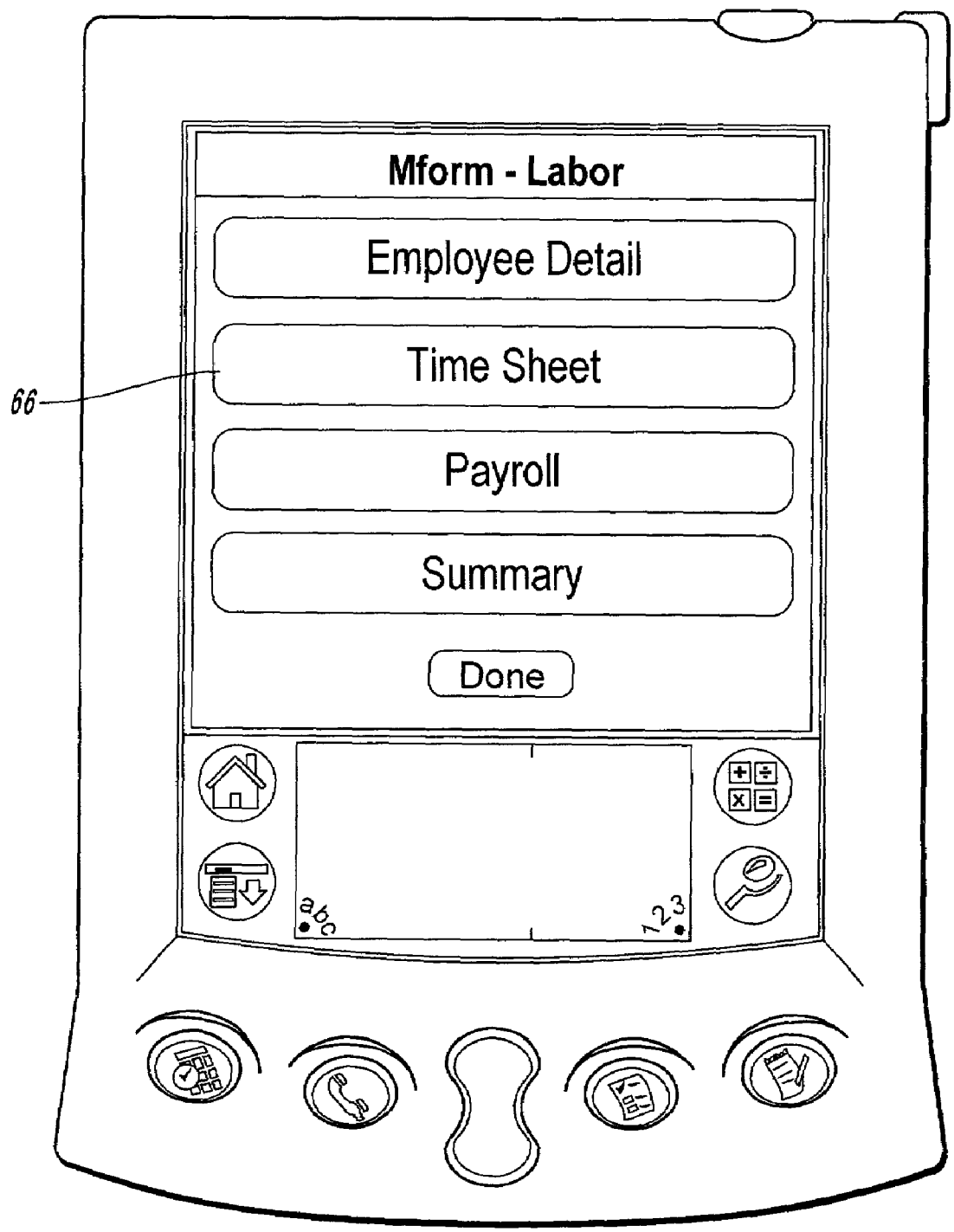
Figure 50:
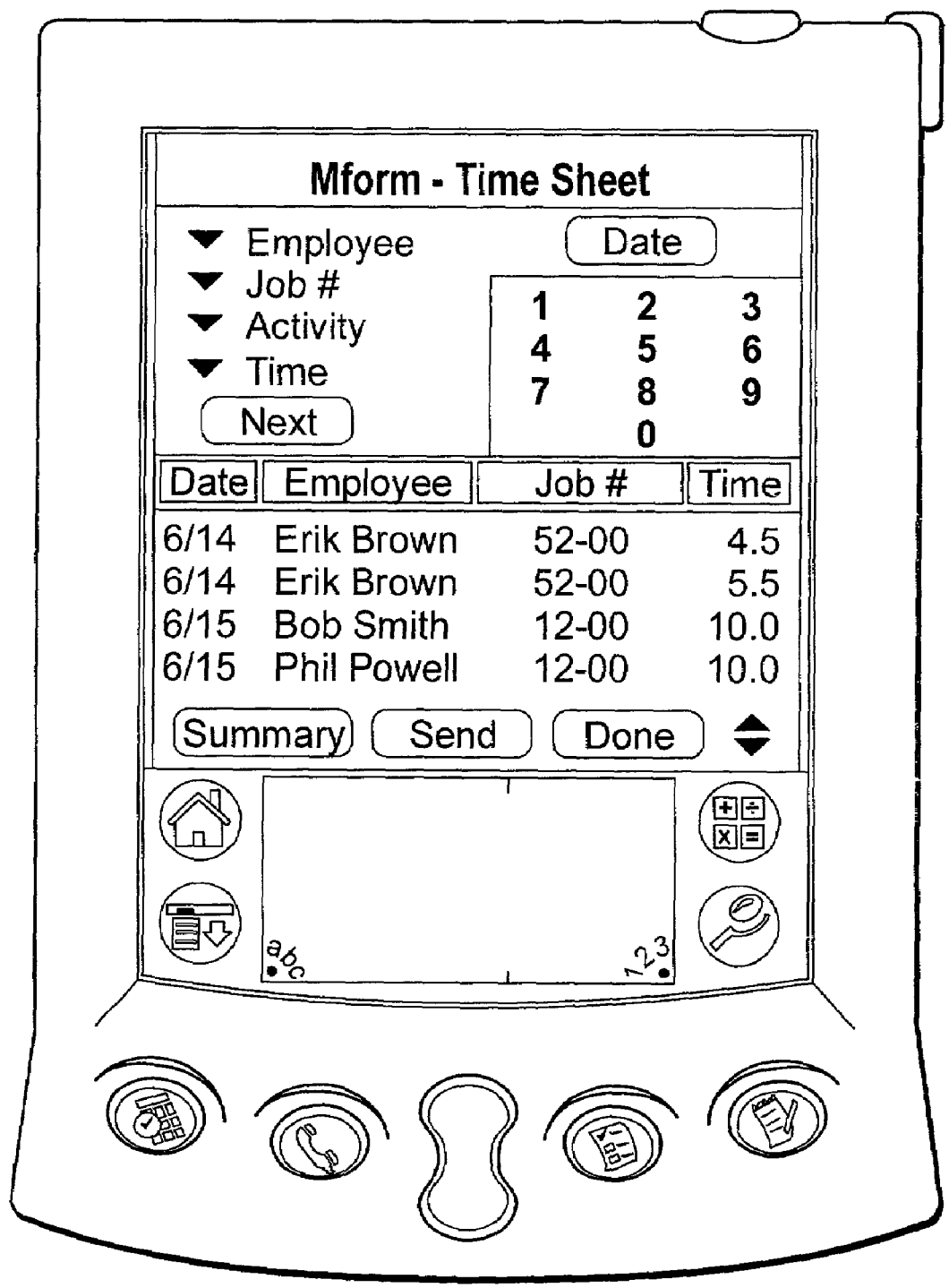
Figure 5P:
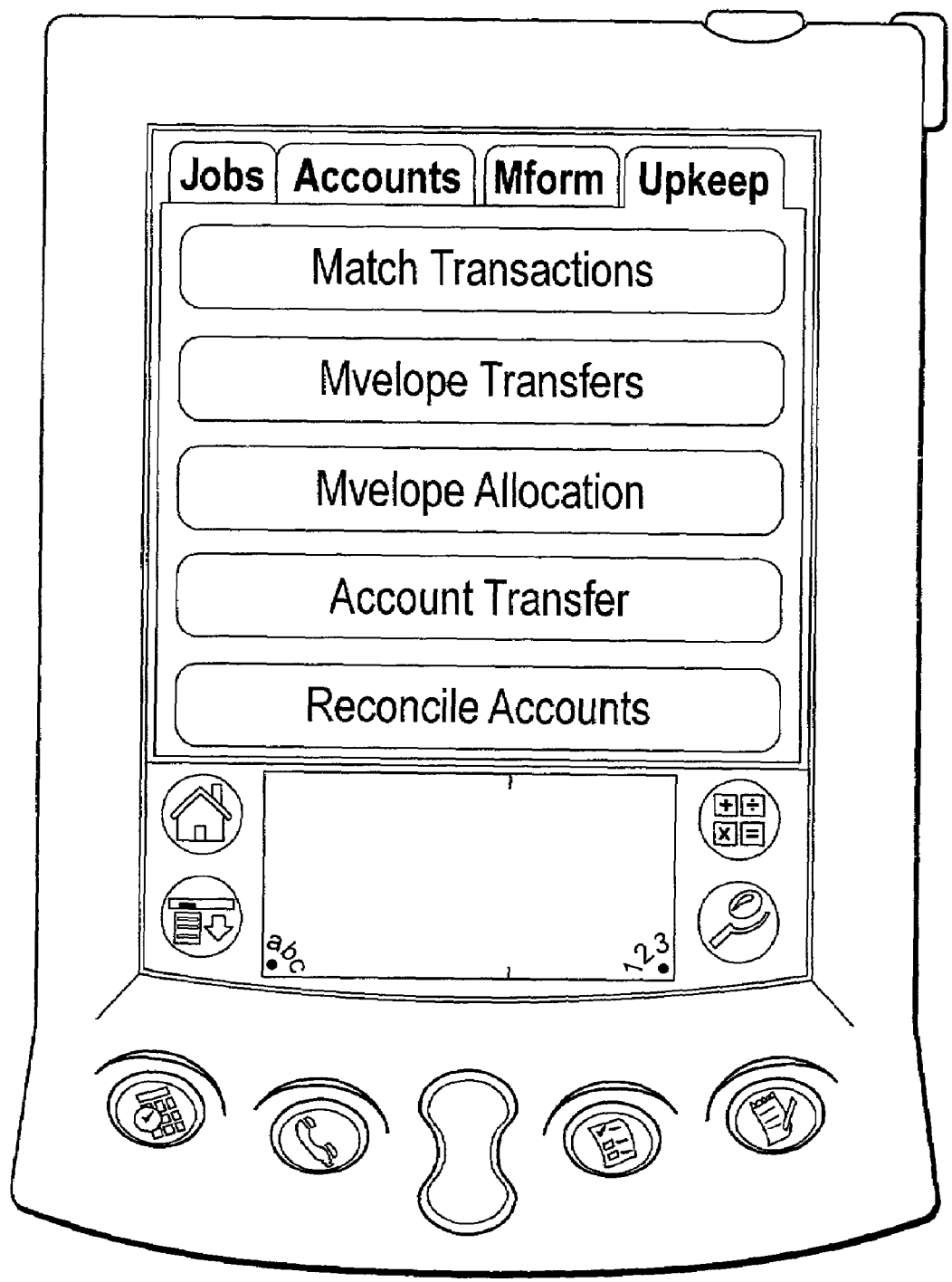

FIG. 5n shows a screen where the user 10 may choose to maintain employee detail, enter daily time, and view payroll or time summary information. For example, time sheets 40a (shown in FIG. 2) might be entered by the user 10 or directly submitted by the business user's employees 14d (referring back to FIG. 1a) via fax, e-mail, or other electronic or manual means. The time sheets 40a might then be set to automatically debit the "labor" virtual spending account 46b within the appropriate job account and, after authorization, cut payroll checks. In one embodiment, the "Process Payroll" button (shown in FIG. 5j) enables the user 10 to authorize the cutting of the payroll checks. Payroll payments are preferably sent electronically directly to the employees' personal accounts. This ability to process payroll in a mobile electronic environment provides significant time savings to the user 10.

FIG. 5o shows a time sheet screen activated by screen button 66 of FIG. 5n. Here, the user 10 can enter time by date, employee, job number, and activity. Further, daily totals are displayed. From this screen, the user 10 may select to view a time summary screen.

FIG. 5p shows a main upkeep screen where the user 10 may select upkeep activities including accepting and matching transactions, transferring amounts from one account to other accounts, allocating transactions, and reconciling accounts.

Thus, the user 10 may remotely enter and keep track of various transactions with respect to any particular job account. In addition, documents such as job quotes, purchase orders, and time sheets can be transmitted back and forth remotely by fax or by other electronic means. As just shown, a preferred embodiment of the present invention allows the user 10 to create purchase orders and invoices, keep a record of employees, enter employee time sheets, process payroll, and allocate and reconcile incoming and outgoing transactions between the various virtual accounts—all within a mobile computing environment.

Thus, the present invention allows the user to make real-time, informed spending decisions in accordance with the user's defined budget limits and in an intuitive and simple manner.

The present invention may be embodied in other specific forms without departing from its spirit or essential characteristics. The described embodiments herein should be deemed only as illustrative. Indeed, the appended claims indicate the scope of the invention; the description, being used for illustrative purposes, does not limit the scope of the invention. All variations that come within the meaning and range of equivalency of the claims are to be embraced within their scope.

What is claimed is:

1. A method for job-based budget management of a business, the method comprising:
    providing a virtual job account and a virtual allocation account which combined correspond to an actual account, wherein each of said virtual job account and said virtual allocation account comprises a balance, which balance represents a fraction of funds available from said actual account;
    maintaining a user-defined numerical spending limit for each of the virtual job account and the virtual allocation account;
    allocating at least one transaction to at least one of the virtual job account and the virtual allocation account;
    automatically adjusting the balance of the virtual account to which the transaction is allocated in real time according to the allocated transaction;
    inputting said user defined numerical spending limit and said balance into a computer;
    comparing said adjusted balance of the virtual account to which the transaction is allocated to said user-defined numerical spending limit of the corresponding account;
    accessing results of said comparison; and
    managing said job-based budget based on said results of said comparison.

2. The method of claim 1 wherein the at least one transaction is automatically synchronized with the actual account.

3. The method of claim 1 wherein the virtual accounts are displayed in a graphical format.

4. The method of claim 1 wherein the method is performed using wireless communication.

5. The method of claim 1 wherein the at least one transaction is transmitted both over the Internet and by a method that does not use the Internet.

6. The method of claim 1 further comprising providing for submission of invoices.

7. The method of claim 1 further comprising providing for submission of purchase orders.

8. The method of claim 1 further comprising providing for submission of time sheets.

9. The method of claim 1 further comprising processing a payroll.

10. The method of claim 1 further comprising automatically creating at least one virtual job account or virtual allocation account upon approval of a job quote.

11. The method of claim 1 further comprising automatically paying the at least one transaction over the Internet.

12. The method of claim 1 further comprising:
    providing funding for the actual account so that the actual account is a funded actual account;
    providing a plurality of virtual job-based budget accounts corresponding to the funded actual account;
    providing a plurality of virtual job-based allocation accounts corresponding to each of the plurality of virtual job-based budget accounts;
    inputting into a computer initial balances for said virtual job-based budget accounts corresponding to job-based budgets and wherein said balances comprise a fraction of funds available from said funded actual account;
    inputting into a computer initial balances for said virtual job-based allocation accounts wherein said balances comprise a fraction of funds available from said virtual job-based budget accounts;
    allocating at least one job-based transaction to at least one of the plurality of virtual job-based allocation accounts;
    automatically adjusting the balance of at least one of said plurality of virtual job-based allocation accounts according to the allocated job-based transaction;
    comparing said adjusted balance of the at least one of said plurality of virtual job-based allocation accounts to a budgeted amount in real-time;
    accessing results of said comparison through said computer; and
    managing said job-based budget based on said comparison results.

13. The method of claim 12 further comprising automatically adjusting the balance of at least one of said plurality of virtual job-based budget accounts corresponding to the at least one of said plurality of virtual job-based allocation accounts adjusted according to the allocated job-based transaction.

14. The method of claim 13 further comprising automatically adjusting the balance of the funded actual account according to the allocated job-based transaction.

15. The method of claim 12 wherein the at least one job-based transaction is automatically synchronized with at least one of said plurality of virtual job-based budget accounts.

16. The method of claim 12 wherein the at least one job-based transaction is automatically synchronized with the actual account.

17. The method of claim 12 wherein the plurality of virtual job-based allocation accounts are displayed in a graphical format.

18. The method of claim 12 wherein the plurality of virtual job-based budget accounts are displayed in a graphical format.

19. The method of claim 12 wherein the method is performed using wireless communication.

20. The method of claim 12 wherein the at least one job-based transaction is transmitted both over the Internet and by a method that does not use the Internet.

21. The method of claim 12 further comprising providing for the submission of invoices that correspond to at least one of the virtual job-based allocation accounts.

22. The method of claim 12 further comprising providing for the submission of purchase orders that correspond to at least one of the virtual job-based allocation accounts.

23. The method of claim 12 further comprising providing for the submission of time sheets that correspond to at least one of the virtual job-based allocation accounts.

24. The method of claim 12 further comprising processing a payroll that corresponds to at least one of the virtual job-based allocation accounts.

25. The method of claim 12 further comprising automatically creating at least one virtual job-based budget account upon approval of a job quote.

26. The method of claim 25 further comprising automatically creating a plurality of virtual job-based allocation accounts corresponding to the automatically-created virtual job-based budget account upon automatic creation of the virtual job-based budget account.

27. The method of claim 12 further comprising automatically paying the at least one job-based transaction on-line.

* * * * *